United States Patent
Nelson et al.

(10) Patent No.: US 10,204,481 B2
(45) Date of Patent: *Feb. 12, 2019

(54) SYSTEM AND METHOD FOR REMOTE RENDERING OF CONTENT ON AN ELECTRONIC GAMING MACHINE

(71) Applicant: IGT, Las Vegas, NV (US)

(72) Inventors: Dwayne R. Nelson, Las Vegas, NV (US); Steven G. LeMay, Reno, NV (US)

(73) Assignee: IGT, Las Vegas, NV (US)

( * ) Notice: Subject to any disclaimer, the term of this patent is extended or adjusted under 35 U.S.C. 154(b) by 310 days.

This patent is subject to a terminal disclaimer.

(21) Appl. No.: 15/285,036

(22) Filed: Oct. 4, 2016

(65) Prior Publication Data

US 2017/0024951 A1 Jan. 26, 2017

Related U.S. Application Data

(63) Continuation of application No. 13/432,698, filed on Mar. 28, 2012, now Pat. No. 9,466,173.

(Continued)

(51) Int. Cl.
*G07F 17/32* (2006.01)
*A63F 13/30* (2014.01)

(52) U.S. Cl.
CPC ............ *G07F 17/323* (2013.01); *A63F 13/30* (2014.09); *G07F 17/32* (2013.01);
(Continued)

(58) Field of Classification Search
CPC .... G07F 13/323; G07F 13/32; G07F 13/3206; G07F 13/3211; G07F 13/3218;
(Continued)

(56) References Cited

U.S. PATENT DOCUMENTS 3,708,219 A 1/1973 Forlini et al.
3,931,504 A 1/1976 Jacoby
(Continued)

FOREIGN PATENT DOCUMENTS

AU 199650576 4/1997
AU 775882 8/2004
(Continued)

OTHER PUBLICATIONS

Wikihow, http:www.wikihow.comAccess-Netflix-on-PlayStation-3, Jun. 29, 2011.

*Primary Examiner* — Omkar Deodhar
*Assistant Examiner* — Wei Lee
(74) *Attorney, Agent, or Firm* — Neal, Gerber & Eisenberg LLP

(57) ABSTRACT

A gaming system is described. The gaming system can include one or more host devices and EGM clients that communicate with one another over a network. Various non-gaming applications can be maintained on the host device. In response to a request received from an EGM client, a non-gaming application program can be executed on the host device. Content from the non-gaming application can be converted to a media stream that is sent to the EGM client for output. The media stream can be processed using a codec executed on the EGM. Input data associated with the content can be received at the EGM and sent to the host device. The content from the non-gaming application executed on the host can be adjusted in response to the input data received from the EGM.

17 Claims, 7 Drawing Sheets

Related U.S. Application Data

(60) Provisional application No. 61/541,492, filed on Sep. 30, 2011, provisional application No. 61/541,490, filed on Sep. 30, 2011.

(52) U.S. Cl.
CPC ...... *G07F 17/3206* (2013.01); *G07F 17/3211* (2013.01); *G07F 17/3218* (2013.01); *G07F 17/3223* (2013.01); *G07F 17/3227* (2013.01); *G07F 17/3241* (2013.01); *G07F 17/3244* (2013.01)

(58) Field of Classification Search
CPC ............. G07F 13/3223; G07F 13/3227; G07F 13/3241; G07F 13/3247; A63F 13/30
USPC .......................................................... 463/25
See application file for complete search history.

(56) References Cited

U.S. PATENT DOCUMENTS

| | | |
|---|---|---|
| 4,333,715 A | 6/1982 | Brooks |
| 4,430,728 A | 2/1984 | Beitel et al. |
| 4,454,594 A | 6/1984 | Heffron et al. |
| 4,517,558 A | 5/1985 | Davids |
| 4,607,844 A | 8/1986 | Fullerton |
| 4,621,814 A | 11/1986 | Stepan et al. |
| 4,659,182 A | 4/1987 | Aizawa |
| 4,718,672 A | 1/1988 | Okada |
| 4,856,787 A | 8/1989 | Itkis |
| 4,911,449 A | 3/1990 | Dickinson et al. |
| 4,912,548 A | 3/1990 | Shanker et al. |
| 5,086,354 A | 2/1992 | Bass et al. |
| 5,113,272 A | 5/1992 | Reamey |
| 5,132,839 A | 7/1992 | Travis |
| 5,319,491 A | 6/1994 | Selbrede |
| 5,342,047 A | 8/1994 | Heidel et al. |
| 5,364,100 A | 11/1994 | Ludlow et al. |
| 5,375,830 A | 12/1994 | Takemoto et al. |
| 5,376,587 A | 12/1994 | Buchmann et al. |
| 5,393,061 A | 2/1995 | Manship et al. |
| 5,467,893 A | 11/1995 | Landis, II et al. |
| 5,539,547 A | 7/1996 | Ishii et al. |
| 5,580,055 A | 12/1996 | Hagiwara |
| 5,585,821 A | 12/1996 | Ishikura et al. |
| 5,589,980 A | 12/1996 | Bass et al. |
| 5,643,086 A | 7/1997 | Alcorn et al. |
| 5,655,961 A | 8/1997 | Acres et al. |
| 5,745,197 A | 4/1998 | Leung et al. |
| 5,752,881 A | 5/1998 | Inoue |
| 5,761,647 A | 6/1998 | Boushy |
| 5,764,317 A | 6/1998 | Sadnovik et al. |
| 5,851,149 A | 12/1998 | Xidos et al. |
| 5,910,046 A | 6/1999 | Wada et al. |
| 5,923,307 A | 7/1999 | Hogle, IV |
| 5,951,397 A | 9/1999 | Dickinson |
| 5,956,180 A | 9/1999 | Bass et al. |
| 5,967,893 A | 10/1999 | Lawrence et al. |
| 6,001,016 A | 12/1999 | Walker et al. |
| 6,015,346 A | 1/2000 | Bennett |
| 6,027,115 A | 2/2000 | Griswold et al. |
| 6,050,895 A | 4/2000 | Luciano et al. |
| 6,054,969 A | 4/2000 | Haisma |
| 6,059,658 A | 5/2000 | Mangano et al. |
| 6,068,552 A | 5/2000 | Walker et al. |
| 6,099,408 A | 8/2000 | Schneier et al. |
| 6,104,815 A | 8/2000 | Alcorn et al. |
| 6,106,396 A | 8/2000 | Alcorn et al. |
| 6,110,041 A | 8/2000 | Walker et al. |
| 6,113,495 A | 9/2000 | Walker et al. |
| 6,135,884 A | 10/2000 | Hedrick et al. |
| 6,149,522 A | 11/2000 | Alcorn et al. |
| 6,159,098 A | 12/2000 | Slomiany et al. |
| 6,190,256 B1 | 2/2001 | Walker et al. |
| 6,213,875 B1 | 4/2001 | Suzuki |
| 6,244,596 B1 | 6/2001 | Kondratjuk |
| 6,251,014 B1 | 6/2001 | Stockdale et al. |
| 6,252,707 B1 | 6/2001 | Kleinberger et al. |
| 6,253,374 B1 | 6/2001 | Dresevic et al. |
| 6,254,481 B1 | 7/2001 | Jaffe |
| 6,293,866 B1 | 9/2001 | Walker et al. |
| 6,315,666 B1 | 11/2001 | Mastera et al. |
| 6,337,513 B1 | 1/2002 | Clevenger et al. |
| 6,347,996 B1 | 2/2002 | Gilmore et al. |
| 6,368,216 B1 | 4/2002 | Hedrick et al. |
| 6,379,244 B1 | 4/2002 | Sagawa et al. |
| 6,398,220 B1 | 6/2002 | Inoue |
| 6,416,827 B1 | 7/2002 | Chakrapani et al. |
| 6,444,496 B1 | 9/2002 | Edwards et al. |
| 6,445,185 B1 | 9/2002 | Damadian et al. |
| 6,446,257 B1 | 9/2002 | Pradhan et al. |
| 6,449,687 B1 | 9/2002 | Moriya |
| 6,453,319 B1 | 9/2002 | Mattis et al. |
| 6,454,648 B1 | 9/2002 | Kelly et al. |
| 6,491,583 B1 | 12/2002 | Gauselmann |
| 6,503,147 B1 | 1/2003 | Stockdale et al. |
| 6,511,375 B1 | 1/2003 | Kaminkow |
| 6,512,559 B1 | 1/2003 | Hashimoto et al. |
| 6,514,141 B1 | 2/2003 | Kaminkow et al. |
| 6,517,433 B2 | 2/2003 | Loose et al. |
| 6,517,437 B1 | 2/2003 | Wells et al. |
| 6,547,664 B2 | 4/2003 | Sauders |
| 6,575,541 B1 | 6/2003 | Hedrick et al. |
| 6,585,591 B1 | 7/2003 | Baerlocher et al. |
| 6,620,047 B1 | 9/2003 | Alcorn et al. |
| D480,961 S | 10/2003 | Deadman |
| 6,634,550 B1 | 10/2003 | Walker et al. |
| 6,645,077 B2 | 11/2003 | Rowe |
| 6,646,695 B1 | 11/2003 | Gauselmann |
| 6,648,761 B1 | 11/2003 | Izawa et al. |
| 6,652,378 B2 | 11/2003 | Cannon et al. |
| 6,659,864 B2 | 12/2003 | McGahn et al. |
| 6,661,425 B1 | 12/2003 | Hiroaki |
| 6,695,703 B1 | 2/2004 | McGahn |
| 6,702,675 B2 | 3/2004 | Poole et al. |
| 6,712,694 B1 | 3/2004 | Nordman |
| 6,715,756 B2 | 4/2004 | Inoue |
| 6,717,728 B2 | 4/2004 | Putilin |
| 6,722,979 B2 | 4/2004 | Gilmore et al. |
| 6,802,777 B2 | 10/2004 | Seelig et al. |
| 6,811,486 B1 | 11/2004 | Luciano, Jr. |
| 6,817,945 B2 | 11/2004 | Seelig et al. |
| 6,817,946 B2 | 11/2004 | Motegi et al. |
| 6,887,157 B2 | 5/2005 | LeMay et al. |
| 6,890,259 B2 | 5/2005 | Breckner et al. |
| 6,906,762 B1 | 6/2005 | Witehira et al. |
| 6,937,298 B2 | 8/2005 | Okada |
| 6,969,319 B2 | 11/2005 | Rowe et al. |
| 7,022,017 B1 | 4/2006 | Halbritter et al. |
| 7,095,180 B2 | 8/2006 | Emslie et al. |
| 7,097,560 B2 | 8/2006 | Okada |
| 7,128,647 B2 | 10/2006 | Muir et al. |
| 7,159,865 B2 | 1/2007 | Okada |
| 7,160,187 B2 | 1/2007 | Loose et al. |
| 7,204,753 B2 | 4/2007 | Ozaki et al. |
| 7,207,883 B2 | 4/2007 | Nozaki et al. |
| 7,220,181 B2 | 5/2007 | Okada |
| 7,252,288 B2 | 8/2007 | Seelig et al. |
| 7,255,643 B2 | 8/2007 | Ozaki et al. |
| 7,309,284 B2 | 12/2007 | Griswold et al. |
| 7,322,884 B2 | 1/2008 | Emori et al. |
| 7,329,181 B2 | 2/2008 | Hoshino et al. |
| 7,419,428 B2 | 9/2008 | Rowe |
| 7,594,855 B2 | 9/2009 | Meyerhofer |
| 7,618,319 B2 | 11/2009 | Casey et al. |
| 7,619,585 B2 | 11/2009 | Bell et al. |
| 7,730,413 B1 | 6/2010 | Engel et al. |
| 7,758,420 B2 | 7/2010 | Saffari |
| 7,918,734 B2 | 4/2011 | Gould |
| 7,997,972 B2 | 8/2011 | Nguyen et al. |
| 8,029,351 B2 | 10/2011 | Kosaka et al. |
| 8,131,649 B2 | 3/2012 | Yen et al. |
| 8,147,339 B1 | 4/2012 | Perry |
| 8,157,642 B2 | 4/2012 | Paulsen |

(56) References Cited

U.S. PATENT DOCUMENTS

| | | |
|---|---|---|
| 8,192,276 B2 | 6/2012 | Walker et al. |
| 8,220,019 B2 | 7/2012 | Stearns et al. |
| 2001/0013681 A1 | 8/2001 | Bruzzese et al. |
| 2002/0045472 A1 | 4/2002 | Adams |
| 2002/0082065 A1 | 6/2002 | Fogel et al. |
| 2002/0142825 A1 | 10/2002 | Lark et al. |
| 2002/0142846 A1 | 10/2002 | Paulsen |
| 2002/0147040 A1 | 10/2002 | Walker et al. |
| 2002/0173354 A1 | 11/2002 | Winans et al. |
| 2002/0183105 A1 | 12/2002 | Cannon et al. |
| 2002/0194505 A1 | 12/2002 | Muschenborn |
| 2003/0027624 A1 | 2/2003 | Gilmore et al. |
| 2003/0032478 A1 | 2/2003 | Takahama et al. |
| 2003/0032479 A1 | 2/2003 | LeMay et al. |
| 2003/0064771 A1 | 4/2003 | Morrow et al. |
| 2003/0064801 A1 | 4/2003 | Breckner |
| 2003/0069074 A1 | 4/2003 | Jackson |
| 2003/0083943 A1 | 5/2003 | Adams et al. |
| 2003/0087690 A1 | 5/2003 | Loose et al. |
| 2003/0130028 A1 | 7/2003 | Aida et al. |
| 2003/0153383 A1 | 8/2003 | Baerlocher et al. |
| 2003/0162582 A1 | 8/2003 | Gordon |
| 2003/0176214 A1 | 9/2003 | Burak et al. |
| 2003/0222876 A1 | 12/2003 | Giemborek et al. |
| 2003/0236114 A1 | 12/2003 | Griswold et al. |
| 2004/0009813 A1 | 1/2004 | Wind |
| 2004/0023714 A1 | 2/2004 | Asdale |
| 2004/0029636 A1 | 2/2004 | Wells |
| 2004/0048671 A1 | 3/2004 | Rowe |
| 2004/0063490 A1 | 4/2004 | Okada |
| 2004/0066475 A1 | 4/2004 | Searle |
| 2004/0087360 A1 | 5/2004 | Chamberlain et al. |
| 2004/0103444 A1 | 5/2004 | Weinberg et al. |
| 2004/0110557 A1 | 6/2004 | Rowe |
| 2004/0116178 A1 | 6/2004 | Okada |
| 2004/0117484 A1 | 6/2004 | Singer et al. |
| 2004/0127284 A1 | 7/2004 | Walker et al. |
| 2004/0142747 A1 | 7/2004 | Pryzby |
| 2004/0147303 A1 | 7/2004 | Imura et al. |
| 2004/0150162 A1 | 8/2004 | Okada |
| 2004/0162146 A1 | 8/2004 | Ooto |
| 2004/0166925 A1 | 8/2004 | Emori et al. |
| 2004/0171423 A1 | 9/2004 | Silva et al. |
| 2004/0180712 A1 | 9/2004 | Forman et al. |
| 2004/0180721 A1 | 9/2004 | Rowe |
| 2004/0183972 A1 | 9/2004 | Bell |
| 2004/0192430 A1 | 9/2004 | Burak et al. |
| 2004/0198485 A1 | 10/2004 | Loose |
| 2004/0207154 A1 | 10/2004 | Okada |
| 2004/0208126 A1 | 10/2004 | Wassew et al. |
| 2004/0209666 A1 | 10/2004 | Okada et al. |
| 2004/0209667 A1 | 10/2004 | Emori et al. |
| 2004/0209668 A1 | 10/2004 | Okada |
| 2004/0209671 A1 | 10/2004 | Okada |
| 2004/0209678 A1 | 10/2004 | Okada |
| 2004/0209683 A1 | 10/2004 | Okada |
| 2004/0214635 A1 | 10/2004 | Okada |
| 2004/0214637 A1 | 10/2004 | Nonaka |
| 2004/0219968 A1 | 11/2004 | Fiden |
| 2004/0224747 A1 | 11/2004 | Okada |
| 2004/0233663 A1 | 11/2004 | Emslie et al. |
| 2004/0235563 A1 | 11/2004 | Blackburn et al. |
| 2004/0239582 A1 | 12/2004 | Seymour |
| 2004/0254010 A1 | 12/2004 | Fine |
| 2005/0020348 A1 | 1/2005 | Thomas et al. |
| 2005/0020358 A1 | 1/2005 | Cram |
| 2005/0032571 A1 | 2/2005 | Asonuma |
| 2005/0037843 A1 | 2/2005 | Wells et al. |
| 2005/0043086 A1 | 2/2005 | Schneider |
| 2005/0049032 A1 | 3/2005 | Kobayashi |
| 2005/0049046 A1 | 3/2005 | Kobayashi |
| 2005/0059494 A1 | 3/2005 | Kammler |
| 2005/0062410 A1 | 3/2005 | Bell et al. |
| 2005/0063055 A1 | 3/2005 | Engel |
| 2005/0079913 A1 | 4/2005 | Inamura |
| 2005/0085292 A1 | 4/2005 | Inamura |
| 2005/0119052 A1 | 6/2005 | Russell et al. |
| 2005/0153772 A1 | 7/2005 | Griswold et al. |
| 2005/0153775 A1 | 7/2005 | Griswold et al. |
| 2005/0153776 A1 | 7/2005 | LeMay et al. |
| 2005/0164762 A1 | 7/2005 | Smith et al. |
| 2005/0192090 A1 | 9/2005 | Muir et al. |
| 2005/0193269 A1 | 9/2005 | Haswell et al. |
| 2005/0206582 A1 | 9/2005 | Bell et al. |
| 2005/0208994 A1 | 9/2005 | Berman |
| 2005/0215311 A1 | 9/2005 | Hornik et al. |
| 2005/0233799 A1 | 10/2005 | LeMay et al. |
| 2005/0239539 A1 | 10/2005 | Inamura |
| 2005/0266912 A1 | 12/2005 | Sekiguchi |
| 2005/0277469 A1 | 12/2005 | Pryzby et al. |
| 2005/0282638 A1 | 12/2005 | Rowe |
| 2005/0285337 A1 | 12/2005 | Durham et al. |
| 2006/0009273 A2 | 1/2006 | Moshal |
| 2006/0041586 A1 | 2/2006 | Nassef, Jr. |
| 2006/0063581 A1 | 3/2006 | Harris et al. |
| 2006/0068898 A1 | 3/2006 | Maya |
| 2006/0079333 A1 | 4/2006 | Morrow et al. |
| 2006/0089194 A1 | 4/2006 | Joshi et al. |
| 2006/0094508 A1 | 5/2006 | D'Amico et al. |
| 2006/0100014 A1 | 5/2006 | Griswold et al. |
| 2006/0103951 A1 | 5/2006 | Bell et al. |
| 2006/0105837 A1 | 5/2006 | Walker et al. |
| 2006/0105841 A1 | 5/2006 | Rom et al. |
| 2006/0125745 A1 | 6/2006 | Evanicky |
| 2006/0135255 A1 | 6/2006 | Roth |
| 2006/0143085 A1 | 6/2006 | Adams et al. |
| 2006/0154729 A1 | 7/2006 | LeMay et al. |
| 2006/0166727 A1 | 7/2006 | Burak |
| 2006/0184626 A1 | 8/2006 | Agapi et al. |
| 2006/0190482 A1 | 8/2006 | Kishan et al. |
| 2006/0191177 A1 | 8/2006 | Engel |
| 2006/0205517 A1 | 9/2006 | Malabuyo et al. |
| 2006/0217202 A1 | 9/2006 | Burke et al. |
| 2006/0258459 A1 | 11/2006 | Davis et al. |
| 2006/0264256 A1 | 11/2006 | Gagner et al. |
| 2006/0264257 A1 | 11/2006 | Jaffe et al. |
| 2006/0282855 A1 | 12/2006 | Margulis |
| 2006/0284574 A1 | 12/2006 | Emslie et al. |
| 2006/0290594 A1 | 12/2006 | Engel et al. |
| 2007/0004510 A1 | 1/2007 | Underdahl et al. |
| 2007/0004513 A1 | 1/2007 | Wells et al. |
| 2007/0010315 A1 | 1/2007 | Hein |
| 2007/0015569 A1 | 1/2007 | Norton et al. |
| 2007/0024002 A1 | 2/2007 | McMain et al. |
| 2007/0032288 A1 | 2/2007 | Nelson et al. |
| 2007/0043616 A1 | 2/2007 | Kutaragi et al. |
| 2007/0060317 A1 | 3/2007 | Martin |
| 2007/0180400 A1 | 8/2007 | Zotov et al. |
| 2007/0243925 A1 | 10/2007 | LeMay et al. |
| 2007/0243928 A1 | 10/2007 | Iddings |
| 2007/0243934 A1 | 10/2007 | Little et al. |
| 2007/0265094 A1 | 11/2007 | Tone et al. |
| 2008/0008188 A1 | 1/2008 | Buga et al. |
| 2008/0009344 A1 | 1/2008 | Graham et al. |
| 2008/0020816 A1 | 1/2008 | Griswold et al. |
| 2008/0020839 A1 | 1/2008 | Wells et al. |
| 2008/0020840 A1 | 1/2008 | Wells et al. |
| 2008/0020841 A1 | 1/2008 | Wells et al. |
| 2008/0076574 A1 | 3/2008 | Okada |
| 2008/0096655 A1 | 4/2008 | Rasmussen et al. |
| 2008/0108426 A1 | 5/2008 | Nguyen et al. |
| 2008/0113747 A1 | 5/2008 | Williams et al. |
| 2008/0125219 A1 | 5/2008 | Williams et al. |
| 2009/0005173 A1 | 1/2009 | Bisson et al. |
| 2009/0098943 A1 | 4/2009 | Weber et al. |
| 2009/0104954 A1 | 4/2009 | Weber et al. |
| 2009/0156303 A1 | 6/2009 | Kiely et al. |
| 2009/0233705 A1 | 9/2009 | LeMay et al. |
| 2010/0105454 A1 | 4/2010 | Weber et al. |
| 2011/0003642 A1 | 1/2011 | Russell et al. |

(56) References Cited

U.S. PATENT DOCUMENTS

| | | |
|---|---|---|
| 2011/0044438 A1 | 2/2011 | Wang et al. |
| 2011/0250948 A1 | 10/2011 | Gagner et al. |

FOREIGN PATENT DOCUMENTS

| | | |
|---|---|---|
| EP | 0454423 | 10/1991 |
| EP | 0484103 | 5/1992 |
| EP | 0769769 | 4/1997 |
| EP | 0997857 | 10/1999 |
| EP | 1195184 | 4/2002 |
| EP | 1255234 | 11/2002 |
| EP | 1260928 | 11/2002 |
| EP | 1282088 | 2/2003 |
| EP | 1462152 | 9/2004 |
| EP | 1492063 | 12/2004 |
| EP | 1524617 | 4/2005 |
| GB | 1464896 | 2/1977 |
| GB | 2120506 | 11/1983 |
| JP | 04220276 | 8/1992 |
| JP | 06043425 | 2/1994 |
| JP | 07124290 | 5/1995 |
| JP | 2000300729 | 10/2000 |
| JP | 00350805 | 12/2000 |
| JP | 01062032 | 3/2001 |
| JP | 01238995 | 9/2001 |
| JP | 01252393 | 9/2001 |
| JP | 01252394 | 9/2001 |
| JP | 02085624 | 3/2002 |
| JP | 2004089707 | 3/2004 |
| JP | 2004105616 | 4/2004 |
| JP | 04166879 | 6/2004 |
| JP | 2005253561 | 9/2005 |
| JP | 2005266387 | 9/2005 |
| JP | 2005266388 | 9/2005 |
| JP | 2005274906 | 10/2005 |
| JP | 2005274907 | 10/2005 |
| JP | 2005283864 | 10/2005 |
| JP | 2006346226 | 12/2006 |
| WO | WO9852665 | 11/1998 |
| WO | WO9942889 | 8/1999 |
| WO | WO9944095 | 9/1999 |
| WO | WO0115127 | 3/2001 |
| WO | WO0115128 | 3/2001 |
| WO | WO0115132 | 3/2001 |
| WO | WO0109664 | 8/2001 |
| WO | WO02073501 | 9/2002 |
| WO | WO03023647 | 3/2003 |
| WO | WO03039699 | 5/2003 |
| WO | WO2004001486 | 12/2003 |
| WO | WO2004102520 | 11/2004 |
| WO | WO2006033986 | 3/2006 |
| WO | WO2006034192 | 3/2006 |
| WO | WO2006038819 | 4/2006 |
| WO | WO2006039132 | 4/2006 |
| WO | WO2007032916 | 3/2007 |
| WO | WO2007040413 | 4/2007 |
| WO | WO2007120444 | 10/2007 |
| WO | WO2007120450 | 10/2007 |
| WO | WO2008061068 | 5/2008 |
| WO | WO2009009269 | 1/2009 |
| WO | WO2009036445 | 3/2009 |
| WO | WO2009140096 | 11/2009 |
| WO | WO2009143274 | 11/2009 |
| WO | WO2010056418 | 5/2010 |
| WO | WO2010120451 | 10/2010 | ly # SYSTEM AND METHOD FOR REMOTE RENDERING OF CONTENT ON AN ELECTRONIC GAMING MACHINE

PRIORITY CLAIM

This application is a continuation of, claims priority to and the benefit of U.S. patent application Ser. No. 13/432,698, filed on Mar. 28, 2012, which claims priority to and the benefit of U.S. Provisional Patent Application No. 61/541,492, filed on Sep. 30, 2011, and which claims priority to and the benefit of U.S. Provisional Patent Application No. 61/541,490, filed on Sep. 30, 2011, the entire contents of which are each incorporated by reference herein.

FIELD OF THE DESCRIBED EMBODIMENTS

The described embodiments relate generally to gaming systems, such as gaming systems deployed in a casino enterprise. More particularly, apparatus and method for outputting content from a remote source on an electronic gaming machine are described are described.

DESCRIPTION OF THE RELATED ART

Casinos and other forms of gaming comprise a growing multi-billion dollar industry both domestically and abroad. A major source of revenue within the gaming industry due to their popularity with player and operators alike are electronic and microprocessor based gaming machines. Electronic gaming machines (EGMs) include various hardware and software components to provide a wide variety of game types and game playing capabilities. Bill validators, coin acceptors, ticket printers, card readers, keypads, buttons, levers, touch screens, displays, coin hoppers, player tracking units and the like are examples of hardware that can be coupled to an EGM. Boot and initialization routines, various game play programs and subroutines, credit and payout routines, image and audio generation programs, security monitoring programs, authentication programs, a random number generator are examples of software components that are often found on EGMs.

The functions available on a gaming machine depend on whether the EGM is linked to other gaming devices. For instance, progressive jackpots, player tracking and loyalty points programs, cashless gaming, bonusing and EGM operational management are examples of functions that can be provided on networked EGMs. Back-end systems including additional hardware and software elements are used to generate these additional functions.

Because gaming machines are typically operable to accept, store, dispense and/or award large sums of money, EGMs are often the targets of theft or tampering. To prevent theft and tampering, EGMs include many security features not present in personal computers or other types gaming platforms, such as home gaming consoles. For example, software, such as the software used to generate and present a wager-based game, is highly tested and documented in a lengthy approval process prior to installation on an EGM. In addition, after an EGM is operational, specialized hardware and software components are utilized to ensure that only approved software is executed on the EGM.

Player's gaming interests are constantly changing and the ability of a casino operator to maximize their operating profits and keep their customers happy is directly linked to their ability to provide new and desirable gaming content. A gaming entity may provide gaming services to tens of thousands of users. For instance, a single land-based casino may include thousands of EGMs. Because of the lengthy approval process required to introduce new software for an EGM, updating and maintaining software within a casino is a time consuming and costly endeavor for both casino operators and EGM manufacturer. In view of the above, apparatus and methods are desired that reduce the costs associated with maintaining and updating gaming content on EGMs.

SUMMARY OF THE DESCRIBED EMBODIMENTS

A gaming system including EGMs is described. The EGMs can be configured to receive a request to access an application program that is executed on a remote host. The application program can be interactive such that it responds to inputs received at the EGM. The application program can be a wager-based gaming application or a non-gaming application. The host can be configured to deliver output from one or more application programs to the EGM as an encoded media stream, such as a MPEG encoded video and/or audio stream. Typically, the media stream will be compressed in some manner. The EGM can be configured decode the media stream and output it to an appropriate output source.

The media stream decoding capabilities allow the EGM to provide basic media playback functions that are often included in a media player. Commercial media players, as stand-alone applications or plug-ins to a web-browser, are more complex. For example, most commercial media players, such as an Adobe™ flash player or an HTML.5 player, include an application hosting environment that allow programs, such as commands in a scripting language, to be executed. The use of an application hosting environment in a commercial media player introduces security risks and uncertainties related to resource utilization that are undesirable in a gaming environment. In addition, for security reasons, EGMs can be equipped less common open or proprietary operating systems, such as QNX, that are not necessarily completely compatible with commercial media players. These compatibilities issues can be avoided by providing basic media playback functions outside of a commercial media player.

The basic media playback functions can enable an EGM to receive and output media streams that allow access to interactive application programs hosted on a remote host. In a particular embodiment, the host can be configured to instantiate a personalized copy of an interactive application program. In one example, the host can be configured to instantiate an application that allows a user's social media account to be accessed and information from the social media account to be output at the EGM. In another example, the host can be configured to instantiate an application program that allows a media library associated with a current user to be accessed from the cloud and output at the EGM.

The host can send one or more media streams associated with an instantiated application program to a client EGM. The application program can include an interface for accessing various functions of the application program. The host can be configured to generate in real-time, a rendering of the interface associated with the application program. The rendering of the interface can include both video and audio components. The rendering of the interface can be included in a media stream and sent to the EGM. The EGM can receive, decode and output contents of the media stream including the interface using the output devices available on the EGM.

In response to outputting the contents of the media stream associated with the interface of the application program executed on the host, the EGM can receive inputs associated with the interface. For example, the inputs can represent selections of options associated with the application program. Information associated with the inputs can be sent to the remote host to alter the internal state of the application program which in some instances can change a state of the interface associated with the application program. The change in state of the interface can be captured in real-time renderings of the interface that are incorporated in a media stream that is sent back to the EGM for subsequent output.

Using this methodology described above, access to interactive application programs executed on a remote can be made available to an EGM without requiring the interactive application program to be maintained and executed on the EGM. Since one host can serve many different EGMs, the software maintenance process is simplified. Further, security issues associated with executing an interactive application program and in particular a third-party application programs on the EGM are avoided. In addition, some of the regulatory issues associated with getting software approved for execution on an EGM can be avoided.

The remote host can also be configured to incorporate and send previously generated content, such as a movie or audio stored in a media file, to the EGM as part of a media stream. The media stream can be formatted to allow a user at the EGM to interact with the included content. For example, the EGM can be configured to accept commands that allow a user to fast forward, pause, rewind or skip the content included in the media stream.

In one embodiment, a game controller on the EGM can be configured to process the media stream received from the remote host where the game controller is also configured to control a wager-based game played on the EGM. The game controller may also be able to generate and output gaming content associated with the play of a wager-based game. In another embodiment, a secondary device with a secondary controller can be configured to process the media stream received from the host. The secondary device can be retrofitted to an EGM that has already been deployed in a gaming environment.

In other embodiments, the secondary device on the EGM can be configured to act as an application host to the game controller and stream content associated with an application executed on the secondary device to the game controller. In some embodiments, to address network bandwidth issues, the EGM can be configured to receive a media stream from a remote host or the media stream can be generated locally in a secondary device within the EGM. The gaming system including the remote host and the EGM with the secondary device can be configured to switch between remote hosting of an application program and local hosting of the application. For example, when it determined network bandwidth is plentiful (above some threshold value), an application program can be executed on a remote host and streamed to the EGM. However, when it is determine network bandwidth is not plentiful, the application can be instantiated for execution locally on the secondary device and then streamed or sent in some other format from the secondary device to a game controller on the EGM.

One aspect of the embodiments described herein can be related to a method on an electronic gaming machine (EGM) including a processor and a memory configured to allow play of a wager-based game. The method can be generally characterized as including 1) sending a message to a remote host including a) information associated with media stream processing capabilities on the EGM, b) information associated with output device resources available to output a media stream that includes an interface of an application program executed on the remote host and c) information associated with input devices available to receive input data for the interface of the application program; 2) determining in a negotiation with the remote host input device resources and output device resources to allocate to the media stream and media stream parameters associated with the media stream; 3) receiving a media stream container from the remote host; 4) extracting one or more media streams from the media stream container; 5) decoding, using a codec, media signals in the media stream; 6) outputting the decoded media signals including the interface for the application program to one or more output devices coupled to the EGM allocated for the media stream; 7) while the decoded media signals including the interface are being output, receiving input data from one or more input devices allocated for the media stream; and 8) sending the input data to the remote host wherein a state of the interface for the application program is altered on the remote host in response to receiving the input data.

Another aspect of the described embodiments is related to a method on a server including a processor, a memory and a network interface. The method can be generally characterized as comprising: 1) establishing by the processor communications with a plurality of EGMs via the network interface; 2) instantiating by the processor a first copy of a third-party non-gaming application; 3) negotiating by the processor input device resources and output device resources on a first EGM that are to be allocated to a media stream and media stream parameters associated with the media stream wherein the media stream is to include at least a video interface of the instantiated first copy; 4) generating by the processor a media stream container including the media stream in accordance the input device resources, the output device resources and the media stream parameters negotiated with the first EGM; 5) sending by the processor the media stream container to the first EGM; 6) receiving input data from the first EGM; 7) determining the input data is associated with an input event for the video interface of the instantiated first copy; 8) providing by the processor the input event to the instantiated first copy wherein the input event causes the video interface to change its state; and 10) updating by the processor the media stream to include a new state of the video interface.

Yet another aspect of the described embodiments is related to an electronic gaming machine (EGM). The EGM can include i) a cabinet; ii) a display coupled to the cabinet; iii) a network interface secured within the cabinet; iv) a value input device coupled to the cabinet; v) a value output device coupled to the cabinet; vi) one or more input mechanisms coupled to the cabinet; vii) a game controller secured within the cabinet including a processor and a memory communicatively coupled to the display, the network interface, the value input device, the value output device and the one or more input mechanisms. The game controller can be configured to: 1) control a deposit or a withdrawal of credits from the EGM via the value input device and the value output device; 2) receive a wager of the credits in a wager-based game; 3) provide play of the wager-based game using at least the display and the one or more input mechanisms; 4) establish communications via the network interface with a remote host; 5) negotiate input device resources and output device resources to allocate to a first media stream including an interface of an application program executed on the remote host; 6) receive a media stream container from the remote host; 7) extract at least the first media stream from the media stream container; 8) decode, using a codec, media signals in the media stream; 9) output the decoded media signals to the allocated output device resources; 10) while the decoded media signals are being output, receive input data from the allocated input device resources and 11) send the input data to the remote host wherein a state of the interface for the application program is altered on the remote host and subsequently in the first media stream received at the EGM in response to receiving the input data.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

Figure 1:
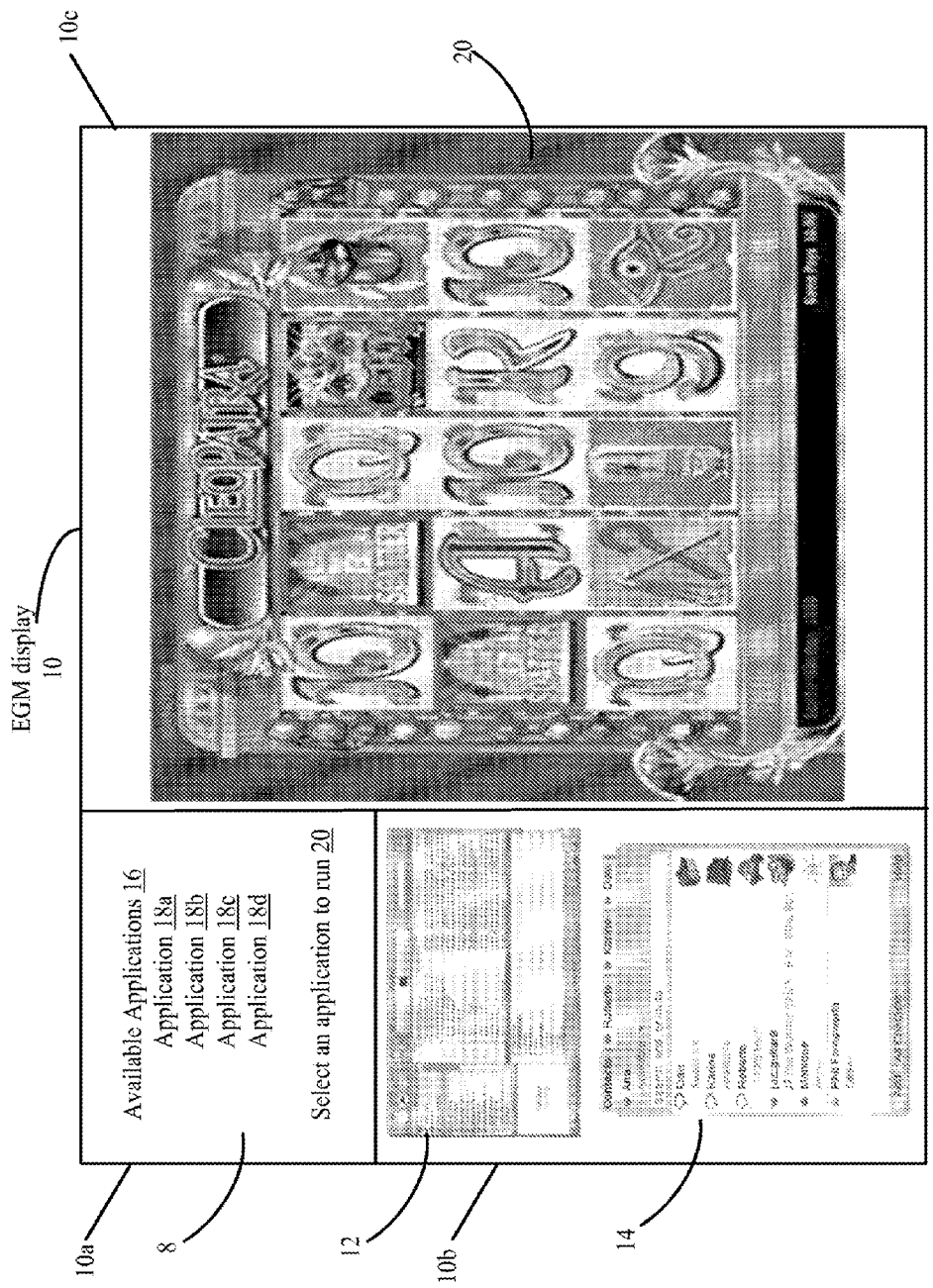
FIG. 1 shows a display on an EGM including remotely rendered content in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A gaming system is described. The gaming system can include at least one host and EGM clients coupled to the host via a network. The host can be configured to execute interactive gaming and non-gaming application programs and send content output from the application programs in a digitally formatted media stream to the EGM clients. The media stream can include compressed video and/or audio signals. The EGMs can be configured to receive the digitally formatted media stream and process it in a manner that allows it to be output via an output mechanism coupled to the EGM. For example, for streamed video data, the EGM can include video codecs that allow a video signal to be extracted from a media stream and output to a display device coupled to the EGM.

The application programs executed on the remote host can be interactive programs such that the output of the application programs is adjusted according to user inputs. For example, an interface associated with the application program can be rendered in real-time on the host and output as part of the media streams sent to the EGM client. The EGM can be configured to receive user inputs via one or more input mechanisms coupled to the EGM. The inputs can be sent back to the host to affect the internal state of the application program executing on the host.

In various embodiments, an EGM can be configured to receive and process different types of media streams from a remote host where a game controller and/or a secondary controller on the EGM can process the media streams alone or in conjunction with one another. In one embodiment, as described above, the controller or controllers on an EGM client can process a media stream from an interactive application program executed on a remote host. The media stream can include content from the remote host that was previously rendered in real-time in response to internal state changes associated with the application program, such as a change to the interface associated with the application program. The EGM client can be configured to receive inputs that affect the internal state of the application program executing on the remote host where the inputs are sent from the EGM client to the host.

Input data sent from the EGM client to the host can include touch input, gesture input, button input, switch input, analog device (e.g., joystick), voice input and combinations thereof. The gesture inputs can be derived from sources, such as visual image data, thermal image data or accelerometer data. In one embodiment, the EGM client sends raw input data to the remote host. The remote host receives the input data and determines whether any events have occurred, such as an event that changes the internal state of an application program executing on the host.

In another example, the EGM can be configured to process a media stream including a light-weight application, such as a Rich Internet Application. The light weight application can include executable instructions, such as script commands, that are embedded in the media stream and executed locally at the EGM. In one embodiment, when the gaming machine includes a game controller and a secondary controller, a media stream including commands for execution on the EGM can be processed by the secondary controller to simplify the regulatory approval process associated with the light-weight application. In addition, the EGM can be configured to generate some types of content such as a particular set of wager-based games locally on the EGM. For example, the EGM can include a game controller designed to generate local content, such as a play of a wager-based game.

Details of embodiments involving remote hosting of content generation on EGM are described with respect to the following figures. In particular, with respect to FIG. 1, a display screen on EGM including video content streamed from a remote host is described. With respect to FIG. 2, a host configured to stream content to EGMs and EGMs configured to receive the stream content are discussed. A method in an EGM including receiving and processing a data stream of content from a remotely generated application is described in FIG. 3. With respect to FIG. 4, a method in a host for generating a data stream for an EGM is described. Finally, with respect to FIGS. 5, 6 and 7, additional details of gaming systems supporting wager-based gaming are described.

Remote Hosting of Content Generation on an EGM

FIG. 1 shows a display 10 on an EGM including remotely rendered content. The display for purposes of illustration is divided into three parts 10a, 10b and 10c. Video content 20 associated with a wager-based game is displayed in 10*c*, video content associated with two application programs, 12 and 14, is displayed in 10*b* and video content associated with a menu 8 that can be used to select application programs for execution are displayed in 10*a*. In one embodiment, the display 10 can include a touch screen that can be used to interact with one or more of the application programs that are output. For example, via the touch screen, a user may be able to provide inputs that affect that state of the application programs that generate video content, 12, 14 or 20.

The arrangement and number of display portions is described for the purposes of illustration only. In other embodiments, the content associated with the different application programs can be output to different locations on display 10. Further, content from more or less application programs can be output. For example, at a first time, before a selection of any application program has been received, content 12 or 14 is not displayed. Then, the application program associated with content 12 can be selected and only content 12 can be displayed. Finally, the application program associated with content 14 can be selected and both content 12 and 14 can be displayed.

All or portion of the application programs used to generate the video content can be executed locally on the EGM or on one or more different hosts in communication with the EGM via network. For example, a first application program executing on a first remote host can be used to generate menu 8, a second application program executing on a second remote host can be used to generate content 12, a third application program can be executed on a third remote host to generate content 14 and a fourth application program can be executed on a fourth remote host can be used to generate content 20. In another example, an application program can be executed locally on the EGM, such as by a game controller within the EGM, to generate content 20 and three different application programs can be executed on a remote host to generate menu 8, content 12 and content 14.

In one embodiment, as is described in more detail below, the EGM can be configured to blend content from multiple sources. In particular, video content from two sources can be combined at the EGM to generate a single composite image for output to a display or audio from two different sources can be blended for output to an audio device. The combining at the EGM can also include video scaling of the video content to fit and available display area. For example, the EGM can be configured to blend sounds from a wager-based game with user-selected music source such that the audio is transitioned from only music sounds, to games and music sounds or just game sounds and back to music sounds. The blending can also be performed remotely at a host.

The sources used to execute application programs from which content is output to display 10 can vary with time. For example, at a first time the game content 20 can be generated from a gaming application program executed locally on the EGM. At a second time a bonus game can be triggered from the gaming application program executed locally, in response, a gaming application program can be instantiated on a remote host that allows a bonus game to be played at the EGM. Bonus game content from the remote host can be displayed in 10*c*. After the bonus game is complete, content from the gaming application executed locally can again be displayed in 10*c*.

As another example, at a first time the EGM can receive a first selection of a wager-based game for play on the EGM. In response to the selection, a wager-based gaming application can be executed locally on the EGM to generate content 20 displayed in 10*c*. At a second time, the EGM can receive a second selection of a second wager-based game for play on the EGM. In response to the second selection, the wager-based gaming application for the second game can be executed on a remote host. A media stream associated with the second game can be received from the remote host and displayed in 10*c*.

In one embodiment, regulated gaming applications associated with generating a wager-based game on the EGM can be executed locally on the EGM or on a remote host whereas non-gaming applications which may not be subject to as a rigorous approval process as the gaming applications may only be generated on a remote host. However, in some embodiments, due to network bandwidth capabilities and/or the amount of data generated by a particular non-gaming application, it may be desirable to execute non-gaming application locally on the EGM. In one embodiment, a game controller that is configured to execute gaming applications can also execute the non-gaming application. In another embodiment, a secondary controller separate from the game controller can execute the non-gaming application.

In one embodiment, the EGM can be configured to receive a selection of non-gaming application program for output to the EGM. For example, in 10*a*, a list of available applications 16 including applications 18*a*, 18*b*, 18*c* and 18*d* is shown. In addition, a message 20 that states, "Select an application to run" is shown. The EGM can be configured to receive a selection of one or more of the applications 18*a*, 18*b*, 18*c* or 18*d* and in response instantiate an executable copy of the application locally or send a request a remote host do so for presentation at the EGM.

In particular embodiments, an approved list of application programs that are available can be maintained on a remote host. Via an account, such as a player tracking account, a player may be able to select list of personal applications that they would like to be able to access on the EGM. The list of personal application programs can be stored and made available on the EGM when the player provides their player tracking information. In some embodiments, one or more of the personal application programs can be selected by the player to be automatically started when they provide their player tracking information at an EGM.

In particular embodiments, all application programs may not be made available to all users at an EGM. For example, players that are registered with a player tracking program and present their player tracking program can be allowed to access a first set of application programs. Whereas, non-registered players or registered players that have not provided their player tracking information may be allowed to access a second set of application programs. In one embodiment, only players registered with a player tracking program may be allowed to have application programs executed on a remote host and then streamed to the EGM client. Within registered players, certain players, such as high-rollers, can be allowed to access more applications than non-high rollers.

In other embodiments, access to application programs can depend on player behavior at the EGM during a current game play session. For example, an amount of money bet or won over some time period may trigger access to certain application programs on the EGM, such as a social media application program that can be used to update their status based on their success or non-success at the EGM. In additional embodiments, application programs that are available can vary from EGM to EGM. For example, a first set of application programs can be available on an EGM with a $5 dollar denomination and a second set of application programs can be available on an EGM with $0.01 dollar denomination.

After an application program is selected, it can be instantiated locally or remotely for execution. Depending on the local capabilities of the EGM, some of the application programs may only be available for execution on the host. For example, the EGM can utilize an operating system that is not compatible with the application program. In another example, some program, such as a set of wager-based gaming applications, may only be available for execution on the EGM.

Content associated with an executed application program can include a real-time rendering of an interface associated with the application program as well as content generated or processed using the application program. For example, if a user selects a music program, such as iTunes™, the real-time rendering of the interface associated with the program can be output and then previously generated audio and/or video content accessed by the program can also be output. The content associated with the application interface and the video and/or audio content can be output as separate media streams or as a combined media stream. In FIG. 1, video content 12 associated with the interface that is output for the iTunes™ application program that has been rendered in real-time at the host and streamed to the EGM is shown.

As another example, if a user selects a text chat program that allows them to contact another individual, then first an interface that allows a user to select an individual to initiate a chat session can be displayed. Then, after the chat session is initiated, the text associated with a chat session can be displayed. In 10b, a contacts portion 14 of an interface for a text chat program is shown.

When output from an instantiated application program includes an interface stream (real-time rendering of the interface for the application program) and a content stream (additional content associated with execution of the application program separate from the interface), the EGM can be configured to hide the interface stream and un-hide the interface stream at different times. For example, the media stream showing interface content 12 can be un-hidden while a user selects video or audio content to output and then can be hidden once the user is finished with their selections. When hidden, the interface content 12 can be represented as a selectable icon where a selection of the icon can cause the media stream including the interface content to be unhidden so that a user can interact with the interface. In one embodiment, when a media stream is hidden, the EGM can continue to receive the media stream but not display it. In another embodiment, when a media stream is hidden, the EGM can request the host to stop sending the media stream. When an indication is received to unhide the application associated with the media stream, then the EGM can send a request to the host to resume the media stream associated with the application.

As described above, certain media streams because they are non-critical to the operation of the EGM can be hidden intentionally at certain times. Typically, the non-critical media streams are not associated with game play on the EGM. During EGM operation, the non-critical media streams may be temporarily interrupted due to error conditions that can result from networking or processing issues. For example, a non-critical stream including a movie can be interrupted or temporarily corrupted in some manner resulting in some discontinuity of the movie that is displayed on the EGM. However, this error doesn't affect game play on the EGM.

In particular embodiments, a media stream or segments of a media stream can include critical data that does affect the outcome of the play of a wager-based game on the EGM. A media stream can be allocated for carrying only critical data or a media stream can include critical and non-critical data mixed together with one another where the critical data is demarcated in some manner. The EGM can be configured with logic that prioritizes the output of critical data over non-critical data included in a media stream. For example, when the presentation of an outcome to a wager-based game is included in a media stream received at an EGM and the presence of the critical data is detected, the EGM can be configured to shift its resources to increase the likelihood of the critical data being output properly. For example, the EGM may stop or slow down the processing of other media streams being received at the EGM until the critical data is successfully output. In addition, the EGM might change the quality at which non-critical data is output. For example, a live sporting event being watched for entertainment purposes at the EGM can be output at a lower quality to increase the chance that a video data associated with a wager-based game streamed to the EGM is properly output.

In one embodiment, the EGM can be configured to determine whether critical data included in a media stream has been successfully output. When the EGM determines the critical data has not been successfully output, it can be configured to enter into a tilt state. In one embodiment, the tilt state can involve suspending game play on the EGM and entering a state that needs to be cleared via operator intervention. The resolution of the tilt state can involve retrieving in some manner the critical data that was not output to the EGM and communicating some portion of the critical data to the player.

In one embodiment, summary information can be included with critical data in a media stream. The summary information may be included at the beginning of the critical data. For example, when a game outcome is streamed in a video format to an EGM, a summary frame can be included at the beginning of video data in a media stream that shows the outcome of the game. When the remaining portion of the critical data can't be output after the summary frame, then as part of the tilt condition, the summary frame can be displayed. For example, the summary frame might be displayed with a message, such as "you won this amount, it is credited to your account, please find another machine to continue playing." When the remaining portion of the critical data is displayed, the gaming machine may not display the summary frame.

In a particular embodiment, the summary frame for a streamed game outcome can include a unique identifier. Another EGM coupled to a host server may be configured to receive the unique identifier and output the stream game outcome associated with the unique identifier to allow a user to see the complete game outcome presentation. In one embodiment, this feature may only be available on an EGM when initiated by an operator with special privileges. In another embodiment, special terminals can be provided that are available solely for this purpose. The player can seek out one of these special terminals to view the remaining portion of their game and then seek additional operator help if it is needed.

In one embodiment, the EGM can save critical summary information, such as a summary frame of a game outcome presentation for auditing and dispute resolution purposes. The summary frame can be stored to a non-volatile memory while the remaining portion of the media stream of the game outcome presentation can be discarded. If there is a dispute the EGM about the outcome of a streamed game, the EGM can include an operator menu that allows an operator to review summary information from past games, such as a summary frame. This information can be shown to a player to resolve a dispute.

As described above, one difficulty associated with executing non-gaming applications programs, such as Facebook™ or iTunes™ on an EGM can be determining and avoiding any security risks associated with the non-gaming application. Another difficulty is that the application simply may not be compatible with the EGM and its native functions, such as its native operating system. Yet another difficulty can be getting the non-gaming application approved for execution on the EGM and then maintaining on the EGM once it is approved. Application maintenance is an issue when the non-gaming application must be reapproved each time the application is improved or modified in some manner. This issue is particular a concern with third-party software not controlled by EGM manufacturers or operators because the third-party developers are not aware of the regulatory or security requirements unique to gaming. As described herein, a remote host executing third-party software and streaming content associated with execution of the software to EGM clients can avoid or lessen some of these difficulties.

Figure 2:
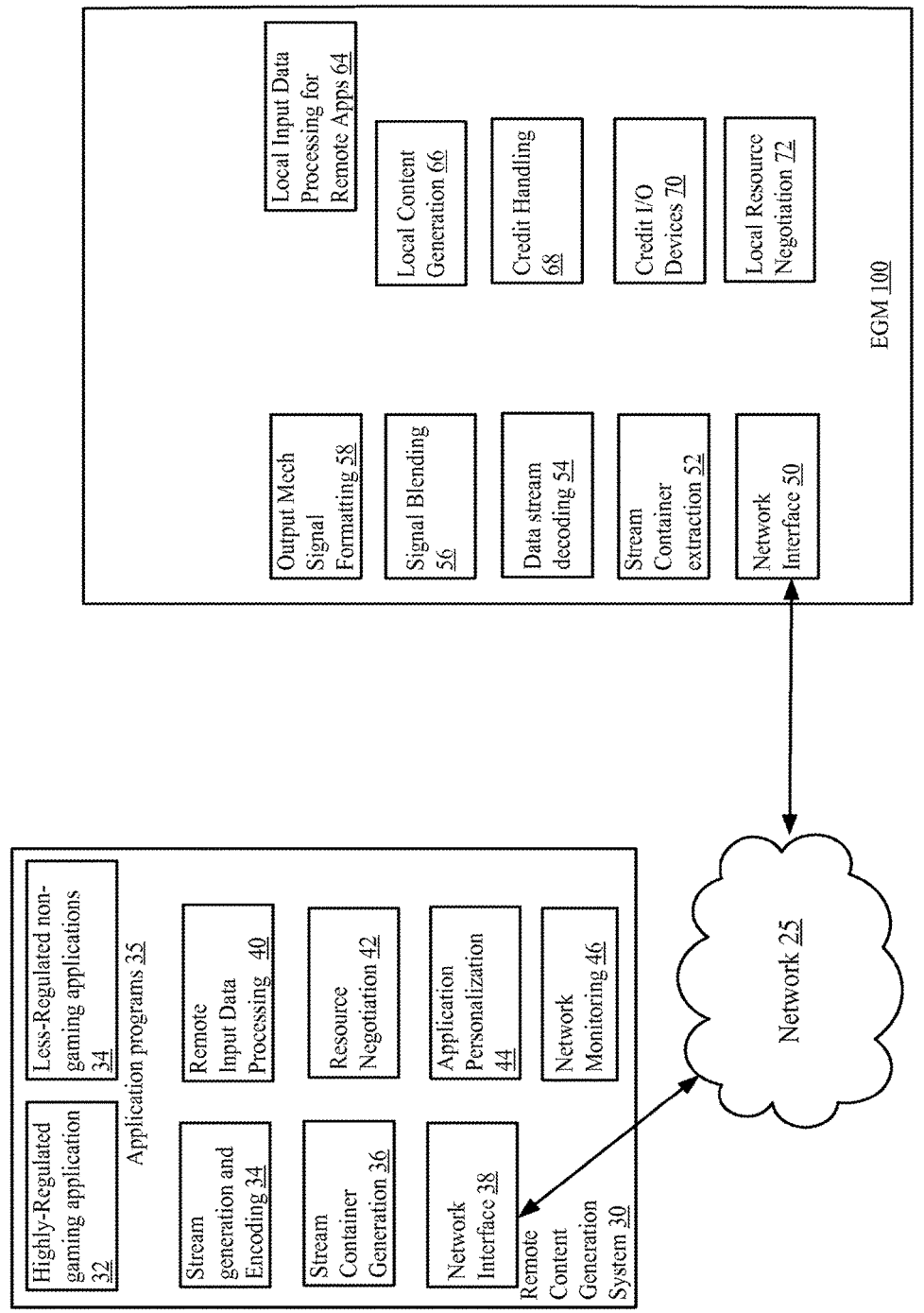
FIG. 2 shows a block diagram of a gaming system including EGMs configured to output locally and remotely generated content in accordance with the described embodiments.

Next, with respect to FIG. 2, an architecture including method and apparatus which addresses some of these difficulties is described in more detail. The system architecture involves executing application programs on a remote host and then sending a media stream associated with the application program to a client EGM where the media stream is output to the EGM client. As described above, the media stream can be associated with an interactive application program. Because the EGM need only process the media stream to allow it to be displayed and is not involved in the generation of the content contained in the media stream, many security and regulatory issues involved with executing the application program on the EGM can be avoided. Further, since one host can serve many EGM clients, issues associated with maintaining the application program can be simplified as the maintenance only has to be performed on the host and not each individual EGM. In addition, the hardware resources (e.g., CPU resources) needed to output certain applications, such as an outcome to a game of chance, may be lessened. Lower hardware resource requirements may lessen the overall cost of the EGM.

FIG. 2 shows a block diagram of a gaming system including EGMs configured to output locally and remotely generated content. The gaming system can include a remote content generation system 30 and a number of EGM clients, such as EGM 100. System 30 can execute application programs that are responsive to user input received at the EGM. For example, a user interface for the application program can be output as a media stream to the EGM client 100. After decoding, the signals, such as video signals encoded in the media stream for the interface, can be output on the EGM client. The state of the interface on the host and hence the associated media stream output from the host can change as a result of the inputs associated with the interface received at the EGM client.

The generation of a media stream that is sent from a host to an EGM client can involve determining a media output format, a media container format and a media codec to use in the process. Details of these objects are first described. Then, their use within the gaming system shown in Figure is described. The media output format basically consists of a set rules and parameters that define the media output. For example, for video output, the native resolution, color depth, the frames per second, pixels per frame per frame, bit rate and video size are a few parameters that can be specified in a video output format. Some examples of video output formats are NTSC, PAL, DVD video format, Blu-ray, VGA, DVI, 720p, 1080p and 1080i. Some audio output formats might include stereo, 5.1/7.1 channel surround sound, WMA, MPE, OggVorbis, Dolby Digital, TruSurround, etc.

A media container format is a format for a wrapper file that contains one or more data streams, such as but not limited to one video stream and one audio stream. The container format specifications provide rules for how data streams are to be included in the container file but don't specify what is in the data streams themselves. Examples of container formats include quick time (e.g., files with .mov and .qt extensions), video for windows (e.g., files with .avi extension), Divx (e.g., files with .divx extension), flash video (e.g., files with .fly extension), MPEG-4 (e.g., files with .mp4 extension) and windows media (e.g., files with .wmv, .wma, .asf and .asx extension).

A codec is an algorithm, which can be thought of as a list of instructions that identifies the method used to compress data into fewer bytes. By following these instructions, applications such as encoders and media players can reliably compress and decompress data. In the case of digital media content, codecs are used to decrease the content's file size and bit rate (the amount of data per second that is required to render audio and video content). A codec stands for a coder/decoder.

The structure of the data of the streams inside the media container file can depend on the codec used to encode it. Typically, the codec performs some type of compression on the raw media data. Codecs enable content authors to specify the bit rate of a stream, which, when coupled with the duration of that stream, determines the size of the resulting file. Some examples of video codecs include H.264, MPEG-4, DivX and WMV. Some examples of audio codecs include AC3, AAC, MP3 and WMA. The codec and the container format don't necessarily have to match. For example, WMV stream format can be embedded in an .AVI container. Traditionally, some media container formats and codecs have shared the same name and been associated with one another for commercial purposes. This tradition sometimes creates confusion when media container file formats and media codecs are discussed.

Next, returning to FIG. 2, further interactions between an EGM client and host system involving the generation of a media stream associated with the execution of an application program on a host system is described. The host system 30 can store a number of application programs 35 that are available for execution on EGM clients. For instance, the host system can store gaming related application programs 32 and non-gaming related application programs 34. The gaming related application programs can involve generating and presenting an outcome to a wager-based game or an associated bonus game. Typically, these application programs must go through a rigorous approval process before they can be played by a gaming participant. After approval, the gaming applications can be regularly checked using authentication programs residing on the host to make sure that only approved gaming applications are being utilized.

The non-gaming applications can be any type of application program that an operator desires to a customer access via an EGM client. The application programs may vary from operator to operator. The application programs can be vetted for security risks and approved copy of a vetted program can be stored in system 30. A copy of the vetted program can be instantiated each time it is used with an EGM client. The use of particular application may require approval by a gaming regulator. However, the application program may not be subject to the approval process and subsequent authentication process required for gaming applications. The approval process can be much less strict because in many cases the application poses no monetary risk or damage to the patron related to gaming activity.

The application programs 35 can be distributed among multiple servers. In one embodiment, one or more servers can be configured to execute only regulated gaming applications while one or more other servers can be configured to execute only less regulated non-gaming applications. In other embodiments, gaming applications and non-gaming applications can be stored and executed on the same device. Further, the other functions, such as stream generation and encoding 34, stream container generation 36, remote input data processing 40, resource negotiation 42 and application personalization 44 can be executed on the same device where the application programs 35 are executed or can be distributed among one or more separate devices.

The process of instantiating application program for execution at the host can be initiated at either the host system 30 or the client 100. For instance, at the EGM client 100, as described with respect to FIG. 1, a list of application programs can be displayed and then instantiation of an application program can be initiated after the EGM client receives a selection. In another example, when the player provides player tracking information at the EGM, it can be sent to a player tracking host. The player tracking host can then notify the remote content generation system 30 to instantiate a number of application programs for output to the EGM client where the application programs are specified in a player tracking account associated with the player (or some other account accessible to the player). In one embodiment, only applications that are specified in the remote account prior to engaging with the EGM client may be accessed by the player and the EGM client may only list these applications and not any additional applications. In yet another example, the host system 30 can receive information from the EGM client related to its status, such as amounts won, amounts lost or an identity or other information known about the player. Based upon the received status information, the host can select and initiate an application program that is to be output at the EGM client.

After a determination is made to instantiate a particular application program, a resource negotiation can be implemented between the host system 30 and the EGM client 100. Via network interface 38 and network 50, a resource negotiation logic component 72 on the EGM 100 can communicate with a resource negotiation logic component on the host system 42. During the negotiation, the host 30 and the EGM client 100 can determine how many data streams are to be provided and their type. For example, for output of a wager-based game on the EGM client 100, the host system might provide a video data stream including the game presentation, an audio stream including sounds associated with the game presentation and one or more video data streams that are to be output on secondary displays, such as a top box display or input buttons including a display, such as an LCD button display.

If the EGM client includes a multi-layer display, such as two-layer display, then the host system can generate separate video data streams for each layer of the display. In another embodiment, the host can provide an interlaced video stream where the frames for each display layer are streamed as a set. In case of a multilayer display where content is not needed for each layer of the display at a particular time, then a default frame can be included. For example, if a movie is being output to a front display of a multi-layer display, then a back display frame might be a sent as a white frame. Thus, the first frame in a set would include the movie frame and the second frame would include a white frame.

As another example, for a non-gaming application like iTunes™, the host may specify that is will send a video data stream showing the application interface for iTunes™, a video data stream for a media program and/or an audio stream for the program. When the media program ends, the host may revert to sending only the media stream including the application interface. In yet another example, separate video data streams can be generated for different applications and included in the same stream container. For example, a first video data stream can be generated for a gaming application program, a second video data stream can be generated for a first non-gaming application and a third video data stream can be generated for a second non-gaming application.

As another part of the resource negotiation, the EGM client 100 can specify types of media stream containers from which it can extract media data streams. On the EGM client, the EGM container extractor 52 can be configured to extract media data streams from a particular media stream container. In one embodiment, the EGM client 100 and host 30 may agree to use a particular media container format to contain the one or more data streams. On the host 30, the stream container generator logic 36 can be configured to generate the specified media container format selected during the resource negotiation. When the EGM client 100 and host 30 are not compatible relative to their media container generation and extraction capabilities then it may not be possible to output the application program on the EGM client and the process can be terminated. The video streaming processing capabilities may vary from EGM client to EGM client. Thus, the host may instantiate a process that is unique to the individual client.

As yet another part of the resource negotiation, the EGM client can specify what video and audio codecs it has available. The decoding of video or audio data contained in a data stream can be performed by the data stream decoding component 54. During the resource negotiation, the host 30 and the EGM client 100 can agree to video and/or audio codecs to utilize for video and/or audio streams that are to be included in the media stream container. When the EGM client 100 and host 30 are not compatible relative to their video and/or audio codec capabilities then it may not be possible to output the application program on the EGM client and the process can be terminated.

In yet another part of the resource negotiation, the EGM client 100 and the host system 30 can communicate to determine parameters related to a video or audio output format for the host to utilize. For example, the EGM client 100 may communicate to the host 30 a resolution of a display it is going to use. The video stream data can be output to a portion of a display. Thus, the resolution can be associated with the portion of the display that is to be utilized. The video data stream may be generated in the native resolution of the display that is going output the video data or at least in a resolution that lends itself to interpolation of the display screen size, such as a multiple of the display screen size. For example, lower resolution video data can be sent to lessen network bandwidth requirements and client side processing requirements. This lower resolution data can be interpolated at the EGM. The stream generation in the specified resolution can be performed by the stream generation and encoding logic 34 on the host 30.

If during an interaction with a host, the EGM client changes some of the output parameters it is using, it may notify the host. In response, the host may adjust how it is generating data streams sent to the EGM client. For example, the EGM client during its interaction with the host may decide to change a display size that it is using to output a video stream. The EGM client may notify the host of the change. In response, the host may change the native resolution of the video content within a media stream to account for the change in resolution of the display. For example, the host may change native resolution of the video content to match the display size which can be smaller or larger.

In one embodiment, the EGM client 100 can be coupled to a user-controlled mobile device. The user-controlled mobile device can be a destination for a media stream generated by the host 30. The host can send the media stream using a wireless communication protocol, such as Wi-Fi or 4G LTE. The EGM 100 client can be configured to establish communications with the mobile device and learn of its output capabilities then it can request the host 30 to send a media stream to the EGM client 100 in a format that can be handled by the user-controlled mobile device. The EGM client 100 can process the media stream from the host and then send it to the mobile device, such as via a wireless Bluetooth™ connection.

During an interaction between the EGM and the host, a user may decide to couple their mobile device to the EGM so that they can listen to music via an interface associated with their mobile device. Prior to coupling their mobile device to the EGM, the host may have been sending an audio data stream including music to the EGM client for output from speakers coupled to the EGM or speakers from a chair coupled to the EGM. The format of the audio signals in the audio data stream may have been selected for compatibility with output to the EGM or chair speakers. In response to determining the desire to output the audio signals in the data stream via the user mobile device, the host can be configured to change a format of the audio signals in the data stream to a format that is compatible with the mobile device.

The EGM client 100 may include signal formatting capabilities, such as video or audio format converters. The format converters can be included in the output mechanism signal formatting 58. Thus, the EGM client 100 may notify the host 30 of its signal conversion capabilities. Based on this information, the host 30 may decide to generate a media stream in a format that is convertible by the output mechanism signal formatting component 58. For example, the EGM client may be able to convert an HDMI formatted video signal to a DVI signal or vice versa. The format conversion can be performed via hardware and/or software on the EGM. In general, the EGM client 100 is going to notify the host to send data in a format that it can output. Signal format conversion may or may not be required before the signal is output.

As part of the resource negotiation, the EGM client 100 and the host 30 can also determine what inputs and input format it can expect from the EGM client 100. For example, if an application program is displayed on a touch screen, the user may be able to provide inputs via the touch screen to control the application. The inputs can be sent to the host 30 and processed via the remote input data processing 40 to affect a particular application program that is executing on the host. In another example, input associated with an application program can be provided via a mechanical input button or touch pad associated with the EGM client's player interface. Thus, the EGM client 100 may describe what types of input and its format that it can expect to receive from the EGM client 100.

Local input data can be processed locally on the EGM client, in 64, and/or remotely on the host 40. For example, in one embodiment, the EGM client in 64 can gather input data it has received, such as input data received from a touch screen or other type of input device, and send it to the host. The host in 40 can process the input data to determine whether an event associated with an application program it is executing has occurred and in response notify the application program. The host and the EGM client may agree to the types of input data that are to be sent and a format in which the input data is to be sent.

In another embodiment, the EGM client can be configured to perform some event processing. As described above, when an application is instantiated the EGM client and host can determine input mechanisms that are to be associated with the application program. Based upon the capabilities determined for the input mechanism, the host can define events and send event definitions to the EGM. The EGM client can be configured to utilize the event definitions received from the host to monitor the input data from the input mechanisms and notify the EGM client when input conditions matching the event conditions occur. For example, the host may instruct the EGM client to notify it as an event when a particular touch input is received from a touch screen in a particular area.

In another embodiment, for efficiency purposes, the host may instruct the EGM client to only send touch input only from a portion of the touch screen. However, the event processing on the sub-set of the touch data may be performed by the host. For example, the host may instruct the client to send raw touch data from a limited area of the touch screen.

When the event is detected by the EGM client, the host can be notified an event has occurred. The remote host can determine what application to which the event applies and in response host can provide the event information to the application program executing on the host. In response to receiving the event information, the application program may change its state. For example, an application interface may change its state to account for a selection of a menu item received from the EGM client. In other embodiments, the host can process the raw input data from the input devices and determine whether an event has occurred.

The event definitions can vary from application program to application program. If multiple applications are being streamed to the EGM client, then the event definitions may encompass multiple applications. In one embodiment, the EGM client may not be aware of which event definitions are associated with each application program or that an event definition is associated with a particular application. In another embodiment, the event definitions can include information about its associated application program. Information about what events have been detected for particular applications can be stored on the EGM and used auditing purposes if needed.

In one embodiment, the EGM client 100 can be configured to match input data to information that identifies the content that is currently being output on the EGM client 100. For example, when a video data stream is being output on the EGM client 100 that is associated with an application program executed on the host and an input is received at the EGM client 100, then the EGM client 100 can be configured to note an identifier associated with a video frame that was output on one of the output mechanisms 60 about the same time as when an input was received. This information can be utilized by the host to process the input data. For example, if the input areas associated with a video interface to an application program change over time, the content information can be used by the host to determine what input areas were active on the interface when the input data was received.

Other functions performed by the host system 30 can be application personalization 44 and network monitoring 46. The application personalization 44 can allow an application program executing on the host to access personal data of the user at the EGM client that is associated with the application program. For example, if iTunes™ is being executed on the host, then the host may receive information from the user during the host-EGM client interaction or prior to the interaction that allows the iTunes™ application to access the user's personal media library from the cloud. To enable access, the user may have to provide account information to the host system 30. In one embodiment, access information, such as user account information, that allows the host to personalize an application can be stored to the user's player tracking account. This information may be used to by the host to instantiate a personalized copy of a requested application when the user is detected and identified at a particular EGM client.

The network monitoring 46 may include the host determining bandwidth between the host 30 and the EGM 100. When bandwidth drops below certain thresholds, the host 30 may take certain actions. For example, the host 30 may not permit additional copies of particular applications that use significant bandwidth to be instantiated. In another example, the host may attempt reduce the data usage of media streams it is generating. For instance, the host may reduce the resolution of video content it is sending in media data streams to one or more clients or increase compression to maintain operations.

Other functions performed by the client, such as 100, can include signal blending 56, local content generation 66 and credit handling 68. Additional functions are described with respect to FIGS. 6 and 7. As an example, the client 100 can be include a game controller to generate a wager-based game that is output to one or more output mechanisms 60 where inputs associated with play of the wager-based game are received from one or more of the input mechanisms. The local content generation 66 can be associated with the game controller. It can be used to generate the presentation for the wager-based game. The credit handling 68 can also be associated with the game controller. It can be used to receive and process information from the credit I/O devices that allow credits to be deposited or removed from the EGM client.

In a particular embodiment, the game controller can be configured to control the credit operations and generate video and/or audio content associated with the credit operations, such as the current amount of credits available on the EGM 100 resulting from wagers and awards from the play of a wager-based game. The video and audio content can be generated by the local content generation. In this embodiment, the presentation of played wager-based games can be generated remotely on host 30 and received at the EGM 10 as a digital media stream from the host 30.

The signal blending 56 can combine locally generated video and audio signals with remotely generated video and audio signals received from a host, such as 30. For example, a video signal from the host 30 can be combined with a video signal from the EGM 100 for output as a signal video signal to a display. As another example, two video signals from the host can be combined with a single video signal from the EGM. If the display includes picture in a picture capabilities then this type of blending may not be necessary, i.e., the EGM 100 may simply route each of the video signals to a portion of the display.

As another example, the EGM 100 can be configured to perform audio blending. For example, a user's own personally selected music can be blended with the sounds generated for wager-based game. The blended audio can be output via speakers in the EGM, via output jack, such as a headphone jack coupled to the EGM, or sent to the user's mobile device for output. In one embodiment, the wager-based game can be generated with cues that effect the blending of the audio streams. For example, cues can be provided that tell the signal blending 58 to switch from a user selected audio stream to the EGM audio so that the EGM audio is output during certain times, such as after a big win or doing a bonus game. The blending performed the signal blending can be gradual. For example, one signal source can be slowly faded out so that it can be barely heard or not heard at all and the other signal source can be faded in until it is the source a player primarily hears.

All or a portion of the logic used to initiate and handle the media streams from the host 30 can be handled via a secondary device coupled to the EGM 100. For example, the output mechanism stream container extraction 52, the data stream decoding 54, the signal blending 56, the output mechanism formatting 58 and the local input data processing for the remote applications 64 can be implemented in a secondary device. The secondary device can include its own processor and memory. It can include its own network interface or utilize a network interface association with the EGM. In one embodiment, the secondary device can be incorporated in a player tracking unit.

Figure 3:
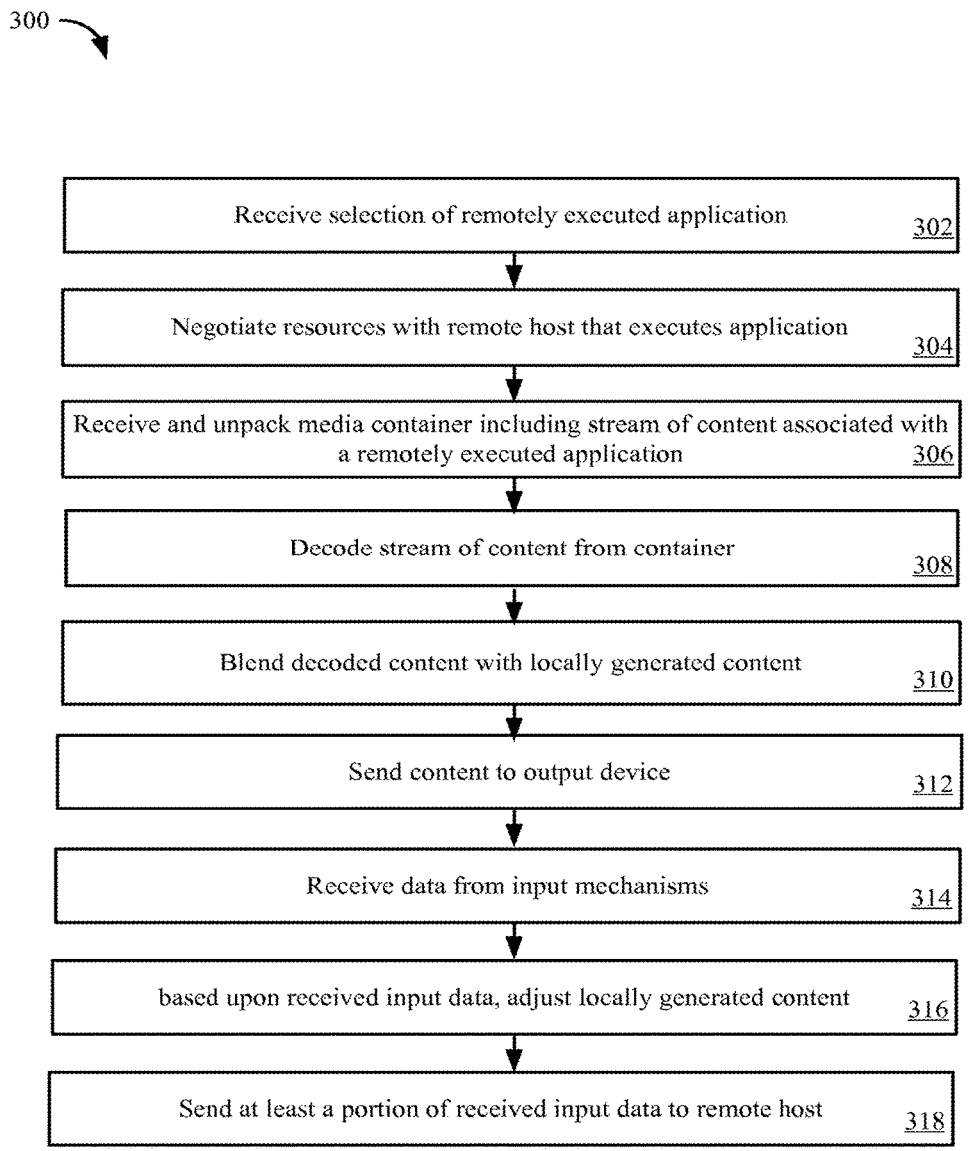
FIG. 3 shows a flow chart of a method in an EGM configured to receive a media stream from a remote host in accordance with the described embodiments.

FIG. 3 shows a flow chart of a method 300 in an EGM configured to receive streamed content from a remote host. In 300, the EGM can receive a selection of a remotely executed application and notify the host of the selection. In another embodiment, the EGM can be notified from the host that an application program executed on a remote host is to be output on the EGM via a media stream generated from the host. In 304, the EGM can negotiate resources with the host. The resource negotiation can involve exchanging information about streaming media containers, codecs, format translators, format converters, output device capabilities and input device capabilities that are available on the EGM.

In 306, the EGM can receive and unpack a media container including one or more streams of content associated with a remotely executed application. The streams can include audio or video data. Further, the streams can include output generated from the application and/or an interface associated with the application. As described above, the application can be an interactive application that is affected by input received at the EGM and sent to the remote host. In 308, using a codec, the EGM can decode audio and/or video signals received in a media stream. The audio and/or video signals can be compressed and the decoding the signals can involve uncompressing the signals. The audio and/or video signals can be decoded using a codec. If necessary, the audio and/or video signals can be converted to another format.

In 310, if necessary, the EGM can blend locally generated and remotely generated media signals. For example, the EGM can be configured to combine a first video signal from the host with a second video signal generated locally on the EGM client. The combined video signal can be output to a video display coupled to the EGM. In one embodiment, a video display device or audio device can include multiple ports for receiving video and/or audio signals from multiple sources and the blending can be performed within the video display device or audio device. In 312, the combined audio and/or video signal can be sent to an output device.

In a media container, the EGM can receive multiple media streams. The media streams can be output to different output devices. For example, a first media stream from a container can be output to a first display device and a second media stream from a container can be output to a second display device. The EGM can be configured to determine an output destination for each of the decoded media signals and output it to the determined output destination.

In 314, the EGM can receive input data from one or more input mechanisms, such as from a touch screen, a mechanical input device or a credit device coupled to the EGM, or from a mobile device coupled to the EGM. In response, in 316, the EGM may adjust locally generated content. For example, if the input is a wager on a wager-based game that is generated locally, than the input can affect the outcome presentation that is generated for the game. In addition, in 318, at least a portion of the received input data can be sent to a remote the host. The remote host can be configured to process the input data to determine whether any events associated with an application program it is streaming to the EGM have occurred.

In one embodiment, the remote host can provide event definitions to the EGM. Based upon the event definitions, the EGM can monitor the input data to determine whether an event has occurred. When an event has occurred that meets the defined event conditions, the EGM can notify the remote host. In other embodiment, the EGM will send the host raw input data and the host will process the raw input data to determine whether an event has occurred.

Figure 4:
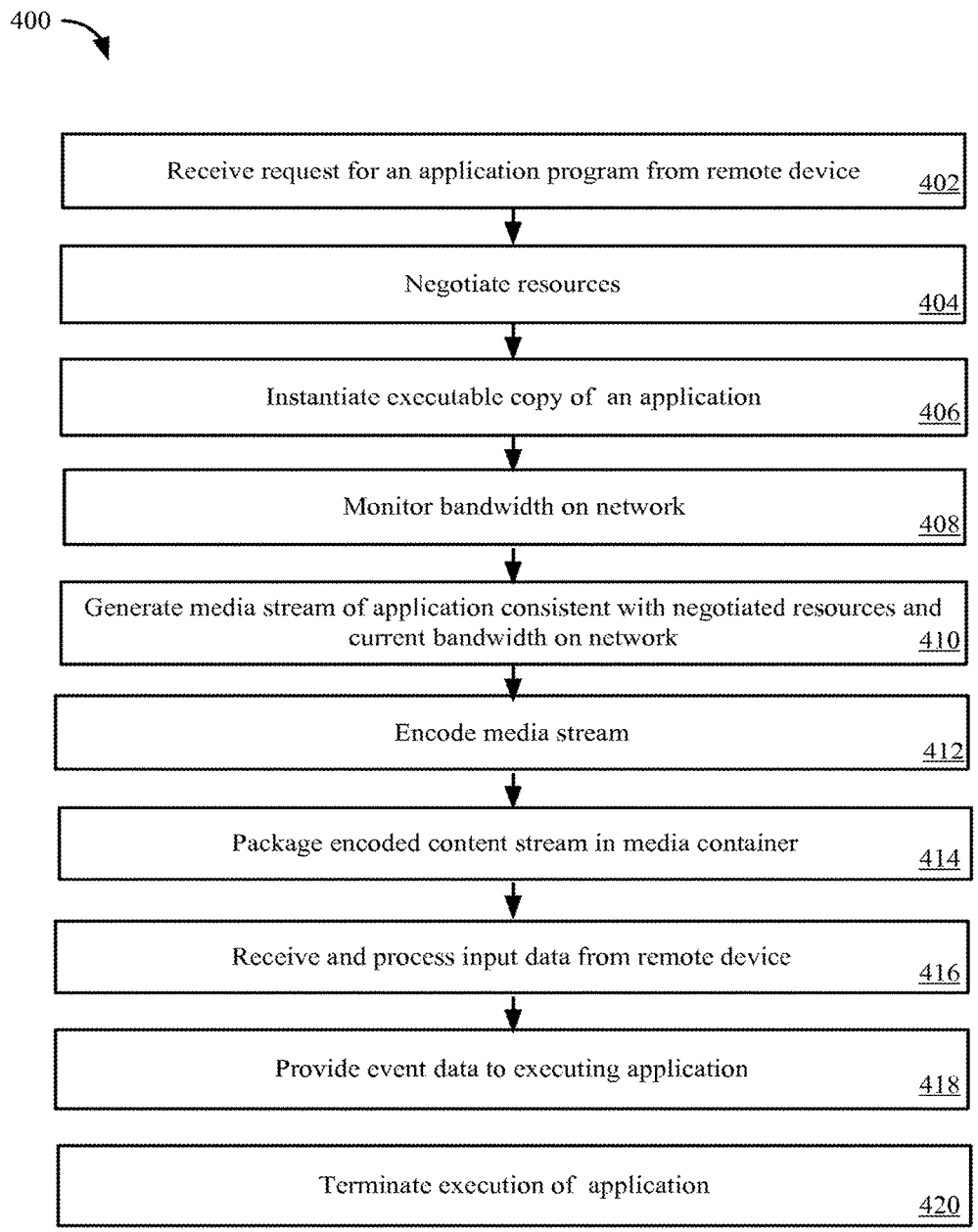
FIG. 4 shows a flow chart of a method in a host configured to generate a media stream for a remote EGM in accordance with the described embodiments.

FIG. 4 shows a flow chart of a method in a host configured to generate a media stream for a remote EGM. In 402, the host can receive the request to execute an application program from a remote device. In another embodiment, based upon information received from a remote device, the host can select an application to execute. In 404, the host and an EGM can negotiate resources that the EGM has available for processing a media stream received from the host, outputting the video and/or audio signals extracted from the media stream and detecting inputs received on the EGM related to the output video and/or audio signals.

In 406, the host can be configured to instantiate an executable copy of an application program. In 408, the host can monitor bandwidth on the network. Based upon the bandwidth, the host may decide to implement steps that reduce the bandwidth utilized by one or more media streams generated on the host and sent to clients. In 410, the EGM can generate a media stream of an application consistent with the negotiated resources and current bandwidth on the network. The media stream can include media of an interface associated with the application program and/or media content output from the application program executed on the host.

First, the host can generate media signals to be incorporated in a media stream. The format of the media signals can be selected for bandwidth considerations as well as the device capabilities on the remote EGM. In 412, the host can encode the media signals where the encoded media signals can be decoded using a codec. The host can determine the encoding to utilize based upon the codecs available on the EGM determined during the resource negotiation. In 414, the host can package the encoded media signals in a media container. The media container can be streamed to a client EGM of the host.

In 416, the host can receive and process input data from the EGM client. The host can determine whether the input data indicates an event associated with an application program streamed to the EGM client has occurred. In one embodiment, the host can send event definitions associated with an application program to the EGM client based upon the input devices on the EGM client associated with the application program. When an event is detected on the EGM that meets the event conditions, information indicating the event has occurred can be sent from the EGM to the host.

In 418, the host can provide the event data to the application program which can affect a state of the application program or content output from the application program. For instance, if an event associated with an application interface is received, the state of the application interface can change and affect the media stream for the application that is generated in 410. In 420, execution of the application can be terminated and the media streaming from the host to the EGM client can be terminated.

Gaming Devices and Systems

Figure 5:
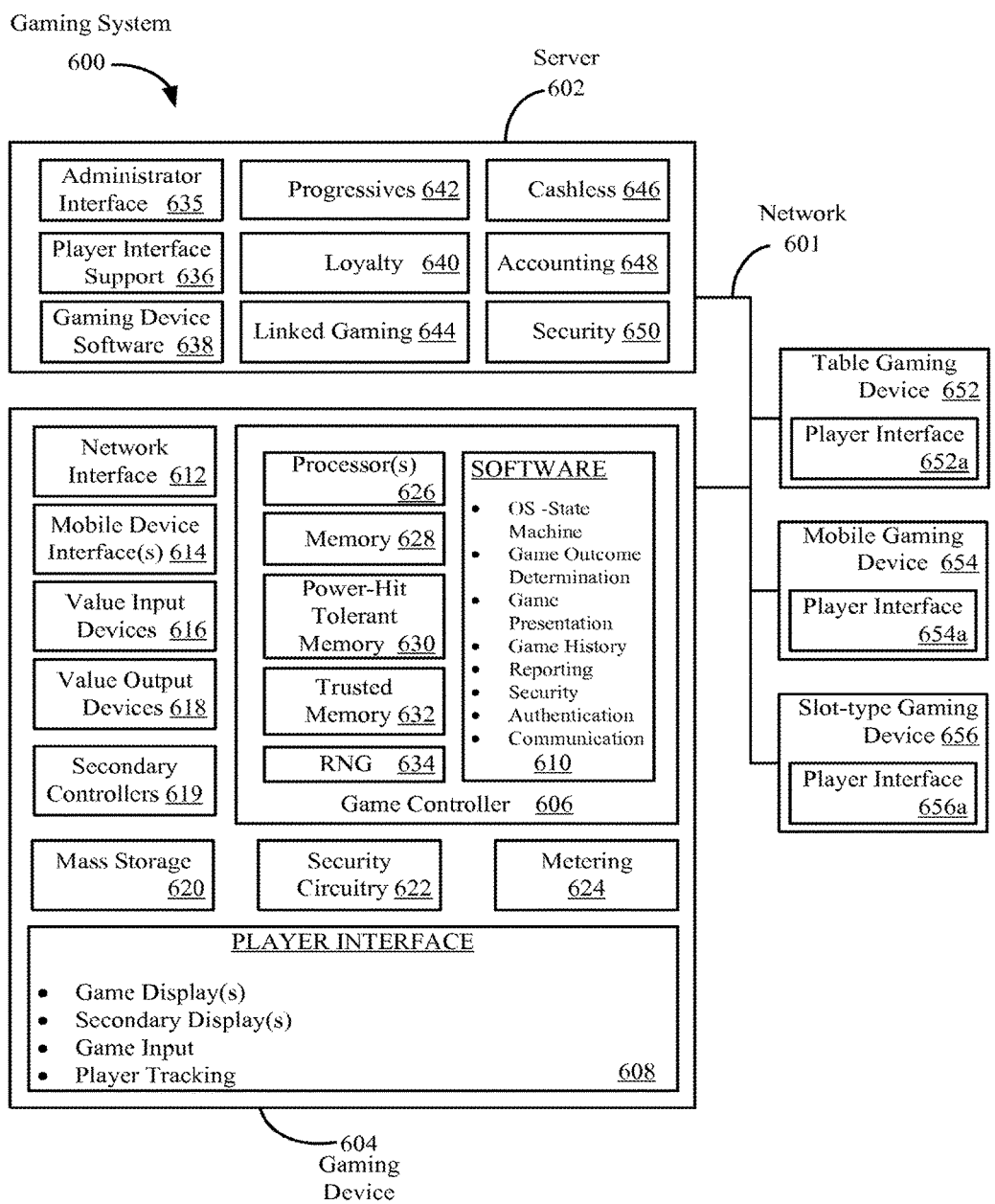
FIG. 5 shows a block diagram of a gaming device in accordance with the described embodiments.
Figure 6:
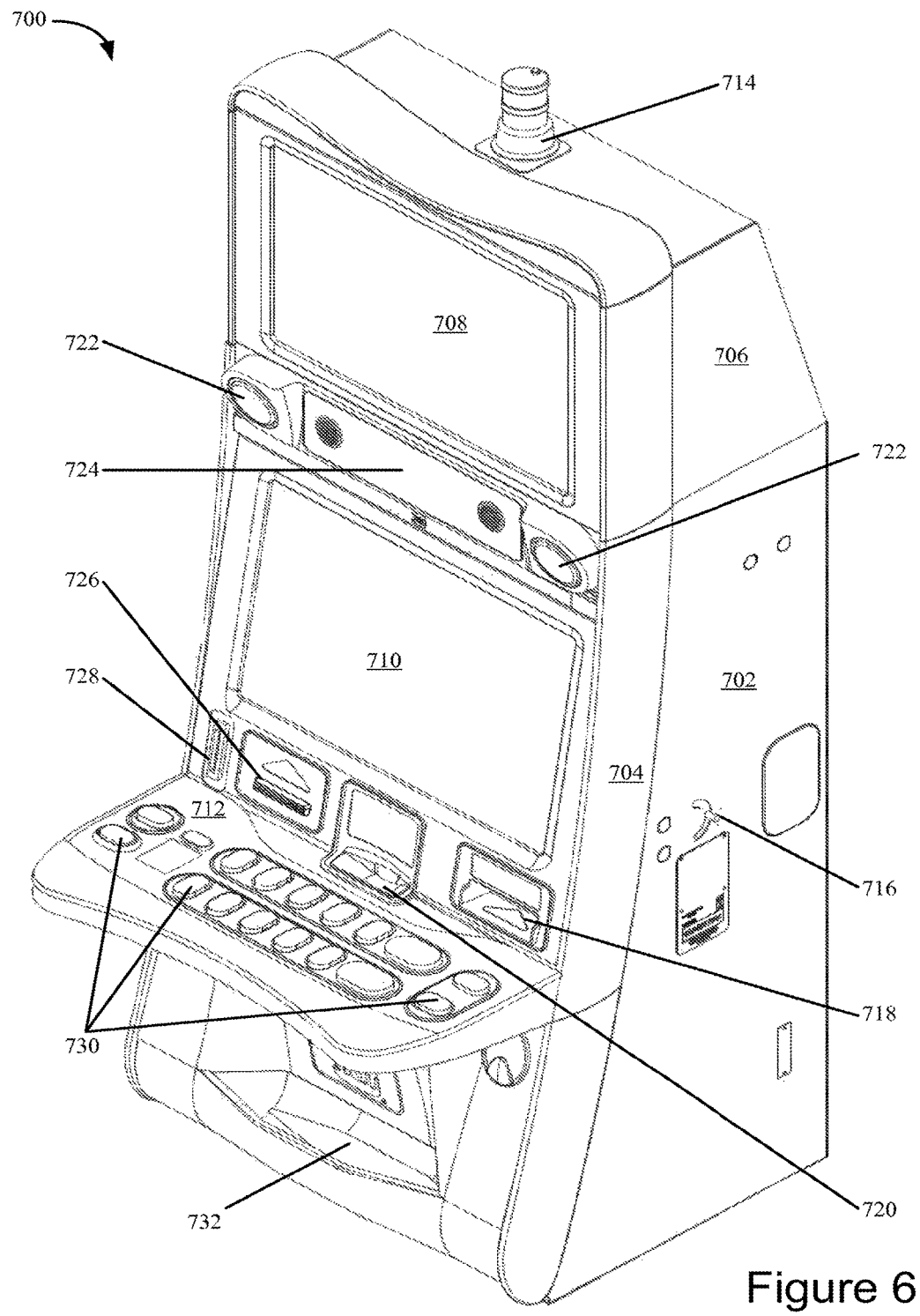
FIG. 6 shows a perspective drawing of a gaming device in accordance with the described embodiments.
Figure 7:
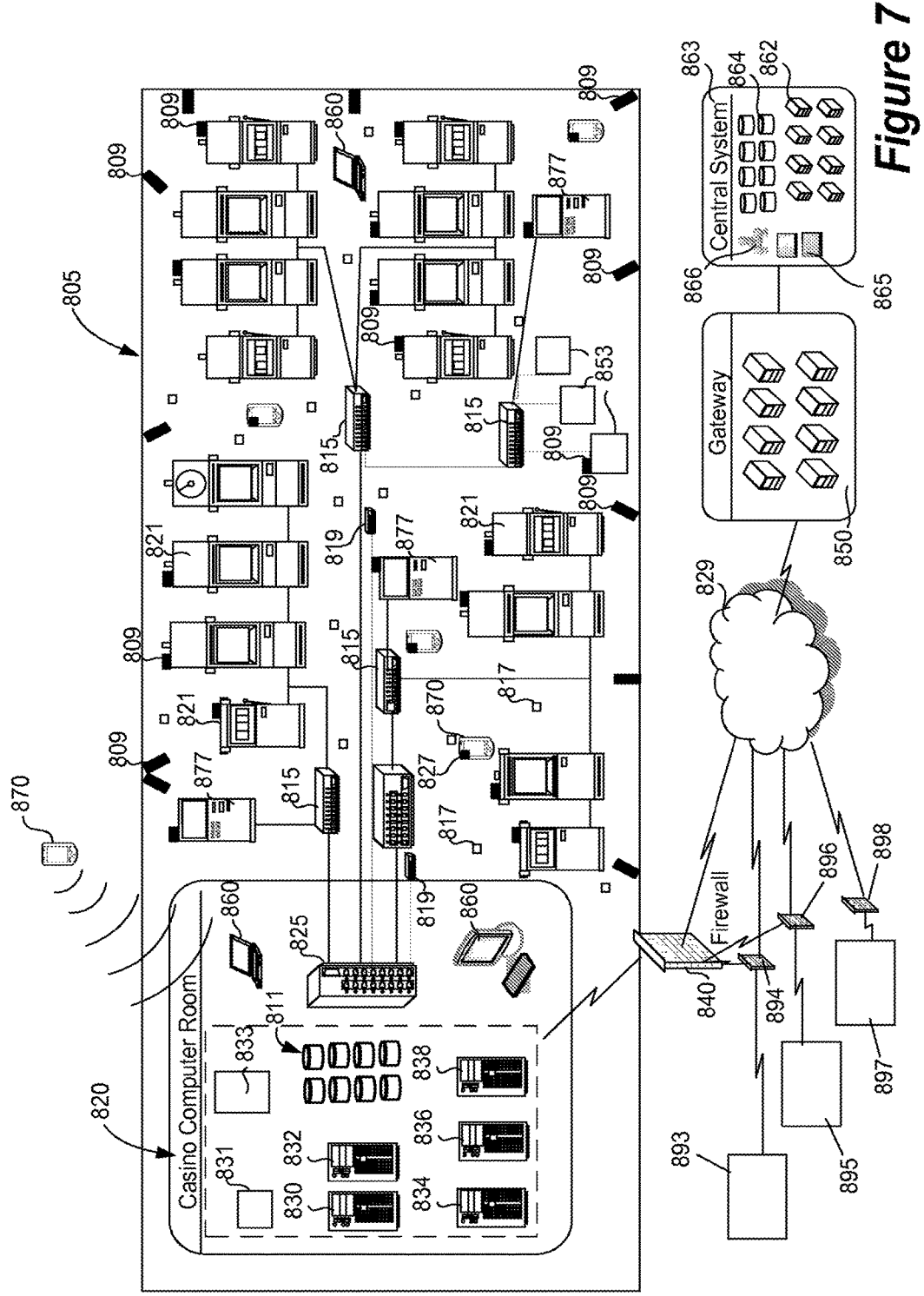
FIG. 7 shows a diagram of a network-based gaming system in accordance with the described embodiments.

Next additional details of gaming systems including EGMs are described with respect to FIGS. 5, 6 and 7. FIG. 6 shows a block diagram of one example of a gaming system 600. A more complex gaming system including additional components is described with respect to FIG. 7. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652*a*, 654*a* and 656*a*, respectively. Typically, gaming devices with a player interface are located in publicly accessible areas, such as a casino floor. On the other hand, some gaming devices, such as server 602, can be located in publicly inaccessible areas, such is in a back-room of a casino or even off-site from the casino. Gaming devices located in publicly inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Near field communication, or NFC, allows for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, a smartphone or tablet with an NFC chip can make a credit card/debit card payment to a gaming device or serve as keycard or ID card for a loyalty program. Further, an NFC device can act a hotel room key. The user of an NFC device as a hotel room keys and/or a player tracking card instrument may allow fast VIP check-in and reduce staffing requirements.

NFC devices can read NFC tags on a gaming device 604 to get more information about the gaming device including an audio or video presentation. For instance, a tap of an NFC enabled device to a gaming device can be used to instantly share a contact, photo, song, application, video, or website link. In another example, an NFC enabled device can be used to transfer funds to the gaming device or enter the player in a multi-player tournament. As another example, an NFC enabled device can be used to receive information from a gaming device that can be used in a persistent gaming application or a social media application.

Further, NFC enabled signage can include NFC tags that allow a patron to learn more information about the content advertised in the signage. The NFC enabled signage can be part of a gaming system. For instance, a sign advertising a show available at the casino can be configured to transfer information about the show, show times and ticketing information via an NFC tag. As another example, a sign showing jackpot information, such as progressive jackpot information, can be used to transfer information about the jackpot, such as the last time the jackpot was won and where it was won.

In one embodiment, an NFC interface on a gaming device can be used to set-up a higher speed communication between the gaming device and another NFC enabled device such as smart phone. The higher speed communication rates can be used for expanded content sharing. For instance, a NFC and Bluetooth enabled gaming device can be tapped by an NFC and Bluetooth enabled smart phone for instant Bluetooth pairing between the devices. Instant Bluetooth pairing between a gaming device and an NFC enabled device, such as a smartphone, can save searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 6.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 6.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652*a*, 654*a* and 656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

The "service window" application can be generated by software code that is executed independently of other game controller software in a secure "sandbox." Via the sandbox, an executable can be given limited access to various resources on an EGM, such as a portion of the CPU resources and memory available on a game controller. The memory can be isolated from the memory used by other processes, such as game processes executed by the game controller.

As described above, a service window application can be allowed to control, send and/or receive data from secondary devices on a gaming device, such as a video display, a touch screen power interfaces or communication interfaces. A service window application allowed to utilize a communication interface, such as a wireless communication interface, can be configured to communicate with a portable electronic device via the communication interface. Thus, a service window application can be configured to implement attract features as described above independently of a game controller on an EGM. Further details of utilizing a service window on a gaming device on an EGM are described in U.S. patent application Ser. No. 12/209,608, by Weber et al., filed Sep. 12, 2008, titled "Gaming Machine with Externally Controlled Content Display," which is incorporated herein by reference in its entirety and for all purposes.

In another embodiment, via the video display, the service window application can be configured to output data in an optical image format, such as a 1-D/2-D bar-code or a QR code. The optically formatted data can be captured by a camera on the portable electronic device. For instance, a receipt indicating the acceptance of a virtual ticket voucher or virtual currency on the gaming device can be displayed in the service window in a QR code format and transferred to a user's portable electronic device via an image capture device on their portable electronic device. In another embodiment, virtual ticket voucher information can be transferred to a portable electronic device as optically formatted image data.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive).

The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 6 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 5, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 6, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 6 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

FIG. 7 shows a server-based (Sb™) gaming network, configured in accordance with some implementations. Those of skill in the art will realize that this architecture and the related functionality are merely examples and that the present disclosure encompasses many other such embodiments and methods. With respect to FIG. 7, casino computer room 820 and networked devices of a gaming establishment 805 are illustrated. Gaming establishment 7805 is configured for communication with central system 863 via gateway 850. Gaming establishments 893 and 895 are also configured for communication with central system 863.

In some implementations, gaming establishments may be configured for communication with one another. In this example, the gaming establishments 893 and 895 are configured for communication with devices within casino computer room 820. Such a configuration may allow devices and/or operators in the casino 805 to communicate with and/or control devices in other casinos. In some such implementations, a server in computer room 820 may control or at least provide information to devices in the casino 805 and devices in other gaming establishments. Conversely, devices and/or operators in another gaming establishment may communicate with and/or control devices in the casino 805.

A server can be configured to provide gaming services to devices, such as EGMs, in one or more gaming establishments. For example, a server of casino 805 or central system 863 may be provisioned with relatively more advanced software (e.g., 3-D facial recognition software) for patron identification than servers of other networked locations. Such a server may process patron identification requests from devices in casino 805 as well as patron identification requests from devices in gaming establishments 893 and 895. As another example, a server in casino 805 can generate and stream content that is output in EGMs located in casino 805 and gaming establishments 893 and 895.

In one embodiment, gaming establishment 897 can be configured for communication with central system 863, but may not be configured for communication with other gaming establishments. Some gaming establishments (not shown) may not be in communication with other gaming establishments or with a central system. Gaming establishment 805 can include many different EGMs, such as 821. The EGMs can be located on a casino floor alone or as part a bank 810 including multiple gaming machines.

In this example, gaming establishment 805 includes a bank of networked gaming tables 853. The networked gaming tables can provide games, such as card games, dice games, roulette and the like. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 853 may be configured for communication with individual player terminals (not shown), which may be configured to accept bets, present an electronic representation of a dealer, indicate game outcomes, etc.

In general, embodiments of the present disclosure may be implemented in gaming establishments having any number of gaming devices, such as EGMs and gaming tables. It will be appreciated that many gaming establishments include hundreds or even thousands of gaming machines and/or gaming tables. The gaming machines can be linked in many different network configurations where some EGMs can be linked to one or more different networks providing different gaming functions while some EGMs may not be connected to a network.

Gaming establishment 805 also includes networked kiosks 877. Depending on the implementation, kiosks 877 may be used for various purposes, including but not limited to cashing out, prize redemption, redeeming points from a player loyalty program, redeeming "cashless" indicia such as bonus tickets, smart cards, etc. In some implementations, kiosks 877 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present disclosure. For example, in some implementations of the disclosure, kiosks 877 may be configured to receive information from a patron, e.g., by presenting graphical user interfaces.

In this example, each bank 810 has a corresponding switch 815, which may be a conventional bank switch in some implementations. Each switch 815 can be configured for communication with one or more devices in computer room 820 via main network device 825, which combines switching and routing functionality in this example. Although various communication protocols may be used, some preferred implementations use the Gaming Standards Association's G2S Message Protocol. Other implementations may use the open, Ethernet-based SuperSAS® protocol, which is available from IGT. Still other protocols, including but not limited to Best of Breed ("BOB"), may be used to implement various embodiments of the disclosure. IGT has also developed a gaming-industry-specific transport layer called CASH that rides on top of TCP/IP and offers additional functionality and security.

In one embodiment, the gaming establishment 705 also can include a wireless network, such as an RFID network, implemented in part by RFID switches 819 and multiple RFID readers 817. An RFID network may be used, for example, to track objects (such as mobile gaming devices 870, which include RFID tags 827 in this example). In addition, patrons, etc., in the vicinity of gaming establishment 805 can carry instruments with RFID tags that allow the patrons to be tracked. In this example, at least some of mobile devices 870 may include an RFID tag 827, which includes encoded identification information for the mobile device 870. Accordingly, the locations of such tagged mobile devices 870 may be tracked via the RFID network in gaming establishment 805. Other location-detection devices and systems may be used to monitor the location of people and/or devices in the vicinity of gaming establishment 805 or elsewhere. For example, wireless signal detectors can be used to track wireless signals emitted from mobile devices, such as signals generated using a cellular, Wi-Fi or Bluetooth™ communication protocol. The mobile devices can be carried by casino patrons and/or casino employees.

Various alternative network topologies can be used to implement different embodiments of the disclosure and/or to accommodate varying numbers of networked devices. For example, gaming establishments with large numbers of gaming machines may require multiple instances of some network devices (e.g., of main network device 825, which combines switching and routing functionality in this example) and/or the inclusion of other network devices not shown in FIG. 7. Some implementations of the disclosure may include one or more middleware servers disposed between kiosks 877, data switches 819 and/or bank switches 815 and one or more devices in computer room 820 (e.g., a corresponding server). Such middleware servers can provide various useful functions, including but not limited to the filtering and/or aggregation of data received from switches, from individual gaming machines and from other devices. Some implementations of the disclosure include load-balancing methods and devices for managing network traffic.

Storage devices 811, Sb™ server 830, License Manager 831, Arbiter 833, servers 832, 834, 836 and 838, host device(s) 860 and main network device 825 can be disposed within computer room 820 of gaming establishment 805. In practice, more or fewer devices may be used. Depending on the implementation, some such devices may reside in gaming establishment 805 or elsewhere.

One or more devices in central system 863 may also be configured to perform, at least in part, tasks specific to the present disclosure. For example, one or more servers 862, arbiter 833, storage devices 864 and/or host devices 866 of central system 863 may be configured to implement the functions described in detail elsewhere herein. These functions may include, but are not limited to, providing functionality for devices such as wager gaming machines 821, mobile devices 870, etc.

One or more of the servers of computer room 820 may be configured with software for receiving a player's wager gaming notification parameters, determining when a wagering condition corresponds with the wager gaming notification parameters and/or providing a notification to the player when the wagering condition corresponds with the wager gaming notification parameters. Moreover, one or more of the servers may be configured to receive, process and/or provide image data from cameras 809, to provide navigation data to patrons (e.g., to indicate the location of and/or directions to a gaming table, a wager gaming machine, etc., associated with a wager gaming notification), etc.

For example, navigation data (which may include map data, casino layout data, camera image data, etc.) may be provided by one or more of the servers of computer room 820 to mobile devices 870. Some implementations of the present disclosure include a plurality of networked cameras 809, which may be video cameras, smart cameras, digital still cameras, etc. In some such implementations, such cameras may provide, at least in part, real-time navigation.

The servers and other devices indicated in FIG. 7 may be configured for communication with other devices in or outside of gaming establishment 805, such as host devices 860, kiosks 877 and/or mobile devices 870, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the disclosure provide one or more of these servers in the form of blade servers.

Some embodiments of Sb™ server 830 and the other servers shown in FIG. 8 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations, many of these devices (including but not limited to License Manager 831, servers 832, 834, 836, and 838, and main network device 825) are mounted in a single rack with Sb™ server 830. Accordingly, many or all such devices will sometimes be referenced in the aggregate as a "Sb™ server." However, in alternative implementations, one or more of these devices is in communication with Sb™ server 830 and/or other devices of the network but located elsewhere. For example, some of the devices could be mounted in separate racks within computer room 820 or located elsewhere on the network. Moreover, it can be advantageous to store large volumes of data elsewhere via a storage area network ("SAN").

Computer room 820 may include one or more operator consoles or other host devices that are configured for communication with other devices within and outside of computer room 820. Such host devices may be provided with software, hardware and/or firmware for implementing various embodiments of the disclosure. However, such host devices need not be located within computer room 820. Wired host devices 860 (which are desktop and laptop computers in this example) and wireless devices 870 (which are mobile computing devices in this example) may be located elsewhere in gaming establishment 805 or at a remote location.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted The invention is claimed as follows:

1. A gaming system comprising:
an input device;
a display device;
at least one processor; and
at least one memory device which stores a plurality of instructions, which when executed by the at least one processor, cause the at least one processor to operate with said display device and said input device to:
(a) receive information relating to a gaming establishment account of a player, wherein the gaming establishment account includes personal data associated with a third-party non-gaming application program,
(b) receive a wager of an amount of credits on a play of a game,
(c) display the play of the game using a first portion of the display device,
(d) determine input device resources and display device resources to allocate to a media stream including an interface of the third-party non-gaming application program executed on a remote host,
(e) simultaneously with using the first portion of the display device to display the play of the game, via the allocated display device resources, display the media stream using a second portion of the display device, wherein the media stream includes at least a portion of the personal data associated with the third-party non-gaming application program,
(f) while the media stream is being displayed, receive input data from the allocated input device resources, and
(g) send the input data to the remote host, wherein a state of the interface of the third-party non-gaming application program is altered on the remote host and subsequently in the media stream in response to receiving the input data.

2. The gaming system of claim 1, wherein when executed by the at least one processor, the plurality of instructions cause the at least one processor to display a list of third-party non-gaming applications on a third portion of the display device that can be executed on and streamed by the remote host.

3. The gaming system of claim 2, wherein when executed by the at least one processor, the plurality of instructions cause the at least one processor to:
receive a selection of a third-party non-gaming application from the list,
send information related to the selection to the remote host, and
subsequently receive a media stream including an interface for the selected third-party non-gaming application from the remote host to be displayed on a fourth portion of the display device.

4. The gaming system of claim 1, wherein when executed by the at least one processor, the plurality of instructions cause the at least one processor to:
generate a media signal associated with the play of the game,
combine the media signal associated with the play of game with the media stream, and
output the combined media signal to the display device.

5. The gaming system of claim 1, which includes a plurality of input devices including (i) an acceptor, and (ii) a cashout device, wherein when executed by the at least one processor, the plurality of instructions cause the at least one processor to operate with the plurality of input devices to: if a physical item is received via the acceptor, establish a credit balance based, at least in part, on a monetary value associated with the received physical item, and if a cashout input is received via the cashout device, cause an initiation of any payout associated with the credit balance.

6. A gaming system server comprising:
at least one processor; and
at least one memory device which stores a plurality of instructions, which when executed by the at least one processor, cause the at least one processor to:
(a) receive information relating to a gaming establishment account of a player, wherein the gaming establishment account includes personal data associated with a third-party non-gaming application program,
(b) receive data associated with a placement of a wager of an amount of credits on a play of a game,
(c) cause a display device to display the play of the game using a first portion of the display device,
(d) determine input device resources and display device resources to allocate to a media stream including an interface of the third-party non-gaming application program executed on a remote host,
(e) simultaneously with using the first portion of the display device to display the play of the game, via the allocated display device resources, causing the display device to display the media stream using a second portion of the display device, wherein the media stream includes at least a portion of the personal data associated with the third-party non-gaming application program,
(f) while the media stream is being displayed, receive input data from the allocated input device resources, and
(g) send the input data to the remote host, wherein a state of the interface of the third-party non-gaming application program is altered on the remote host and subsequently in the media stream in response to receiving the input data.

7. The gaming system server of claim 6, wherein when executed by the at least one processor, the plurality of instructions cause the at least one processor to display a list of third-party non-gaming applications on a third portion of the display device that can be executed on and streamed by the remote host.

8. The gaming system server of claim 7, wherein when executed by the at least one processor, the plurality of instructions cause the at least one processor to:
receive a selection of a third-party non-gaming application from the list,
send information related to the selection to the remote host, and
subsequently receive a media stream including an interface for the selected third-party non-gaming application from the remote host to be displayed on a fourth portion of the display device.

9. The gaming system server of claim 6, wherein when executed by the at least one processor, the plurality of instructions cause the at least one processor to:
generate a media signal associated with the play of the game,
combine the media signal associated with the play of game with the media stream, and
output the combined media signal to the display device.

10. The gaming system server of claim 6, wherein any determined award for the play of the game causes an increase of a credit balance which is increasable via an acceptor of a physical item associated with a monetary value, and decreasable via a cashout device configured to receive an input to cause an initiation of a payout associated with the credit balance.

11. A method of operating a gaming system, said method comprising:
 (a) receiving information relating to a gaming establishment account of a player, wherein the gaming establishment account includes personal data associated with a third-party non-gaming application program,
 (b) receiving a wager of an amount of credits on a play of a game,
 (c) causing a display device to display the play of the game using a first portion of the display device,
 (d) causing at least one processor to execute a plurality of instructions to negotiate input device resources and display device resources to allocate to a media stream including an interface of the third-party non-gaming application program executed on a remote host,
 (e) simultaneously with using the first portion of the display device to display the play of the game, via the allocated display device resources, causing the display device to display the media stream using a second portion of the display device, wherein the media stream includes at least a portion of the personal data associated with the third-party non-gaming application program,
 (f) while the media stream is being displayed, receiving input data from the allocated input device resources, and
 (g) causing the at least one processor to execute the plurality of instructions to send the input data to the remote host, wherein a state of the interface of the third-party non-gaming application program is altered on the remote host and subsequently in the media stream in response to receiving the input data.

12. The method of claim 11, which includes causing the display device to display a list of third-party non-gaming applications on a third portion of the display device that can be executed on and streamed by the remote host.

13. The method of claim 12, which includes:
 receiving a selection of a third-party non-gaming application from the list,
 causing the at least one processor to execute the plurality of instructions to send information related to the selection to the remote host, and
 subsequently receiving a media stream including an interface for the selected third-party non-gaming application from the remote host to be displayed on a fourth portion of the display device.

14. The method of claim 11, which includes:
 causing the at least one processor to execute the plurality of instructions to generate a media signal associated with the play of the game,
 causing the at least one processor to execute the plurality of instructions to combine the media signal associated with the play of game with the media stream, and
 causing the at least one processor to execute the plurality of instructions to output the combined media signal to the display device.

15. The method of claim 11, wherein any determined award for the play of the game causes an increase of a credit balance which is increasable via an acceptor of a physical item associated with a monetary value, and decreasable via a cashout device configured to receive an input to cause an initiation of a payout associated with the credit balance.

16. The method of claim 11, which is executed through a data network.

17. The method of claim 16, wherein the data network is an internet.

* * * * *